US012029955B2

(12) United States Patent
Hawkins, III et al.

(10) Patent No.: US 12,029,955 B2
(45) **Date of Patent: *Jul. 9, 2024**

(54) BICYCLE TRAINER

(71) Applicant: Wahoo Fitness LLC, Atlanta, GA (US)

(72) Inventors: Harold M. Hawkins, III, Atlanta, GA (US); Andrew P. Lull, Boulder, CO (US)

(73) Assignee: Wahoo Fitness LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/095,092

(22) Filed: Jan. 10, 2023

(65) Prior Publication Data

US 2023/0347226 A1 Nov. 2, 2023

Related U.S. Application Data

(63) Continuation of application No. 17/162,685, filed on Jan. 29, 2021, now Pat. No. 11,559,732, which is a (Continued)

(51) Int. Cl.
*A63B 69/16* (2006.01)
*A63B 21/00* (2006.01)
(Continued)

(52) U.S. Cl.
CPC ........ *A63B 69/16* (2013.01); *A63B 21/00069* (2013.01); *A63B 21/0052* (2013.01);
(Continued)

(58) Field of Classification Search
CPC . A63B 69/16; A63B 21/0052; A63B 71/0622; A63B 24/0087; A63B 22/0605; A63B 21/00069; A63B 21/225; A63B 2230/062; A63B 2225/50; A63B 2225/093; A63B 2220/34; A63B 2210/50; A63B 2071/0638; A63B 2069/165; A63B 2024/0093; A63B 2024/009; A63B 2220/54; A63B 2024/0081; G08C 2201/93
See application file for complete search history.

(56) References Cited

U.S. PATENT DOCUMENTS 3,259,385 A * 7/1966 Boren ................ A63B 22/0694 482/60
3,481,331 A * 12/1969 Carr ................. A63B 23/03533 602/24

(Continued)

*Primary Examiner* — Garrett K Atkinson
(74) *Attorney, Agent, or Firm* — Polsinelli PC; Gregory P. Durbin

(57) ABSTRACT

A bicycle trainer including folding legs and a vertically adjustable frame member supporting an axle and cassette where a rider mounts the rear frame, such as dropouts, of a conventional bicycle with the rear wheel removed. The trainer includes a flywheel with a magnetic brake assembly controlled through an open protocol and configured to receive wireless transmitted signals from an app running on a smart phone or other such applications. The flywheel assembly also includes a bracket coupling the magnetic brake with a frame. A strain gauge is mounted on the bracket to detect torque, which is used to calculate a rider's power while using the trainer.

20 Claims, 22 Drawing Sheets

Related U.S. Application Data continuation of application No. 16/011,237, filed on Jun. 18, 2018, now Pat. No. 10,933,290, which is a continuation of application No. 13/975,720, filed on Aug. 26, 2013, now Pat. No. 9,999,818.

(60) Provisional application No. 61/693,685, filed on Aug. 27, 2012, provisional application No. 61/728,155, filed on Nov. 19, 2012.

(51) Int. Cl.

| | |
|---|---|
| ***A63B 21/005*** | (2006.01) |
| ***A63B 21/22*** | (2006.01) |
| ***A63B 22/06*** | (2006.01) |
| ***A63B 24/00*** | (2006.01) |
| ***A63B 71/06*** | (2006.01) |

(52) U.S. Cl.

CPC ........ *A63B 21/225* (2013.01); *A63B 22/0605* (2013.01); *A63B 24/0087* (2013.01); *A63B 71/0622* (2013.01); *A63B 2024/009* (2013.01); *A63B 2024/0093* (2013.01); *A63B 2069/165* (2013.01); *A63B 2071/0638* (2013.01); *A63B 2210/50* (2013.01); *A63B 2220/34* (2013.01); *A63B 2220/54* (2013.01); *A63B 2225/093* (2013.01); *A63B 2225/50* (2013.01); *A63B 2230/062* (2013.01); *G08C 2201/93* (2013.01)

(56) References Cited

U.S. PATENT DOCUMENTS

| | | | | | |
|---|---|---|---|---|---|
| 4,452,447 | A * | 6/1984 | Lepley | A63B 21/00845 | 36/11.5 |
| 4,789,153 | A * | 12/1988 | Brown | A63B 21/0088 | 482/111 |
| 5,067,710 | A * | 11/1991 | Watterson | A63B 21/015 | 434/247 |
| 5,110,003 | A * | 5/1992 | MacWilliams | B60K 15/0406 | 220/288 |
| 5,267,925 | A * | 12/1993 | Boyd | A63B 21/0056 | 188/77 R |
| 5,468,201 | A * | 11/1995 | Minoura | A63B 69/16 | 482/61 |
| 5,711,404 | A * | 1/1998 | Lee | A63B 21/0051 | 188/158 |
| 5,848,953 | A * | 12/1998 | Wei | A63B 21/0051 | 482/63 |
| 6,042,517 | A * | 3/2000 | Gunther | A63B 21/0051 | 188/161 |
| 6,070,774 | A * | 6/2000 | Rak | B60R 9/045 | 224/309 |
| 6,238,155 | B1 * | 5/2001 | Aukzemas | F16B 39/28 | 411/107 |
| 6,273,845 | B1 * | 8/2001 | Liou | A63B 21/0051 | 188/164 |
| 6,695,752 | B2 * | 2/2004 | Lee | A63B 21/0051 | 482/110 |
| 6,964,633 | B2 * | 11/2005 | Kolda | A63B 21/0051 | 482/63 |
| 7,011,607 | B2 * | 3/2006 | Kolda | A63B 21/0051 | 482/57 |
| 7,585,258 | B2 * | 9/2009 | Watson | A63B 24/00 | 188/159 |
| 7,727,124 | B1 * | 6/2010 | Lassanske | A63B 69/16 | 482/61 |
| 7,732,961 | B2 * | 6/2010 | Lin | H02K 1/146 | 310/153 |
| 7,976,434 | B2 * | 7/2011 | Radow | A63B 21/00196 | 482/5 |
| 9,050,494 | B2 * | 6/2015 | Bass | A63B 69/16 | |
| 10,166,434 | B2 * | 1/2019 | Caccia | A63B 69/16 | |
| 2003/0027692 | A1 * | 2/2003 | Phillips | A63B 21/015 | 482/57 |
| 2004/0077465 | A1 * | 4/2004 | Schmidt | A63B 21/0058 | 482/57 |
| 2006/0009329 | A1 * | 1/2006 | Toyama | A63B 21/023 | 482/51 |
| 2006/0234839 | A1 * | 10/2006 | Peterson | A63B 69/16 | 482/61 |
| 2006/0234840 | A1 * | 10/2006 | Watson | A63B 24/00 | 482/61 |
| 2007/0203000 | A1 * | 8/2007 | Chiu | A63B 21/0052 | 482/63 |
| 2008/0096725 | A1 * | 4/2008 | Keiser | A63B 21/0051 | 482/8 |
| 2008/0200308 | A1 * | 8/2008 | Pedrini | A61B 5/0205 | 482/6 |
| 2008/0242511 | A1 * | 10/2008 | Munoz | A63B 22/02 | 482/5 |
| 2010/0179030 | A1 * | 7/2010 | Liao Lai | A63B 21/0051 | 482/63 |
| 2010/0234185 | A1 * | 9/2010 | Watt | A63B 21/0051 | 482/8 |
| 2011/0287902 | A1 * | 11/2011 | Bingham, Jr. | A63B 21/0088 | 482/61 |
| 2012/0004074 | A1 * | 1/2012 | Schelzig | A61B 5/0245 | 482/4 |
| 2012/0166105 | A1 * | 6/2012 | Biermann | A63B 24/0062 | 702/43 |
| 2013/0053223 | A1 * | 2/2013 | Shu-Chiung | A63B 69/16 | 482/61 |
| 2013/0059698 | A1 * | 3/2013 | Barton | A63B 71/0622 | 482/63 |
| 2013/0237386 | A1 * | 9/2013 | Tsai | A63B 21/015 | 482/60 |

* cited by examiner

BICYCLE TRAINER

CROSS REFERENCE TO RELATED APPLICATIONS

The present application is a continuation of U.S. patent application Ser. No. 17/162,685 filed Jan. 29, 2021 and titled "Bicycle Trainer", which is a continuation of U.S. patent application Ser. No. 16/011,237 (now U.S. Pat. No. 10,933, 290) filed Jun. 18, 2018 and titled "Bicycle Trainer", which is a continuation of U.S. patent application Ser. No. 13/975, 720 (now U.S. Pat. No. 9,999,818) filed Aug. 26, 2013 and titled "BICYCLE TRAINER", which claims priority under 35 U.S.C. § 119 to U.S. Provisional Patent Application No. 61/728,155 filed Nov. 19, 2012 titled "BICYCLE TRAINER", and claims priority under 35 U.S.C. § 119 to U.S. Provisional Patent Application No. 61/693,685 filed Aug. 27, 2012 titled "BICYCLE TRAINER", which are each hereby incorporated by reference.

TECHNICAL FIELD

Aspects of the present invention involve a bicycle trainer providing various features including portability, levelability, height adjustment, power measurement, and controllability, such as through a smart device or tablet, among other features and advantages.

BACKGROUND

Busy schedules, bad weather, focused training, and other factors cause bicycle riders ranging from the novice to the professional to train indoors. Numerous indoor training options exist including exercise bicycles and trainers. An exercise bicycle looks similar to a bicycle but without wheels, and includes a seat, handlebars, pedals, crank arms, a drive sprocket and chain. An indoor trainer, in contrast, is a mechanism that allows the rider to mount her actual bicycle to the trainer, with or without the rear wheel, and then ride the bike indoors. The trainer provides the resistance and supports the bike but otherwise is a simpler mechanism than a complete exercise bicycle. Such trainers allow a user to train using her own bicycle, and are much smaller than full exercise bicycles, are often are less expensive than full exercise bicycles.

While very useful, conventional trainers nonetheless suffer from many drawbacks. For example, it is often difficult to level conventional trainers from side to side. Moreover, riding a slightly tilted bicycle is uncomfortable and can cause unintended damage to the bicycle. In another example, many riders prefer that their bicycle be level fore and aft so that it feels like the rider is training on a flat surface as opposed to an incline or decline. Most conventional trainers, however, cannot be vertically adjusted so the rider places boards, books, or the like under the trainer to elevate the entire trainer, or under the front wheels to elevate the front of the bicycle. Similarly, many trainers are designed for a bicycle with a certain wheel size, such as conventional 26 inch wheels, relatively newer but increasingly popular 29 inch mountain bike wheels, and even more recent 700c wheel sizes. However, conventional trainers are meant for only one size bicycle tire and thus a rider would need to have a separate trainer or use boards or the like to elevate the entire trainer if, for example, the user wanted to use a 26 inch trainer with a 29 inch mountain bike.

While many trainers are portable based on the simple fact that they are relatively small. Such trainers are nonetheless heavy, can be awkward to load into car trunks, and can still occupy substantial space when not in use. Portability, however, is important as some folks may want to store their trainer when not in use and some folks may take their trainer to races and the like in order to warm-up before a race and cool-down afterward. Finally, fitness training using a power meter, particularly for bicyclists, is increasingly popular. Power meters measure and display the riders power output (typically displayed in Watts) used for pedaling. Power meters of many different sorts have been adapted for use on bicycles, exercise bicycles and other fitness equipment. Many of these designs, however, are overly complicated, prone to error, and/or prone to failure, and also tend to be relatively expensive.

With these thoughts in mind among others, aspects of the trainer disclosed herein were conceived.

SUMMARY

Aspects of the present disclosure involve a bicycle trainer that provides several advantages over conventional designs. The trainer includes a vertically adjustable rear axle and cassette (rear bicycle gears) where the user mounts her bicycle to the trainer. Generally speaking, the user removes her rear wheel from the drop outs at the rear of the bicycle (not shown) and then connects the rear axle and cassette of the trainer to the drop outs in the same manner that the rear wheel would be coupled to the bicycle. Additionally, the trainer is configured with a reversible spacer that allows for mounting bicycles, such as mountain bicycles and road bicycles, with different width rear wheels and attendant frame or hub spacing.

The cassette is coupled to a pulley that drives a belt connected to a flywheel or other resistance mechanism such that when the user is exercising, her pedaling motion drives the flywheel. The flywheel includes an electromagnetic brake that is controllable. Further, torque imparted on the flywheel by a rider pedaling a bicycle mounted on the trainer, is measured at a bracket interconnecting a portion of the flywheel with a stationary portion of the frame. Based on power measurements, RPM, heart rate and other factors, the magnetic brake may be controlled. Control of the trainer, and display of numerous possible features (power, RPM, terrain, video, user profile, heart-rate, etc.) may be provide through a dedicated device or through a smart phone, tablet or the like, running an app configured to communicate with the trainer.

In one embodiment of the bicycle trainer, the trainer includes a frame assembly that supports an axle to which a rear wheel of a bicycle may be connected. The trainer further includes a flywheel assembly comprising a magnetic brake assembly and a flywheel member, wherein the flywheel assembly is rotatably supported on the frame assembly. The magnetic brake assembly is rotationally fixed by a member coupled between the brake assembly and the frame assembly. The flywheel member is coupled with the axle such that the flywheel spins relative to the magnetic brake assembly when a rider is pedaling a bicycle connected with the axle. The trainer also includes a strain gauge mounted on the member that detects torque imparted on the member when a rider is pedaling.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modification in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

Example embodiments are illustrated in referenced figures of the drawings. It is intended that the embodiments and figures disclosed herein are to be considered illustrative rather than limiting.

DETAILED DESCRIPTION

Figure 1:
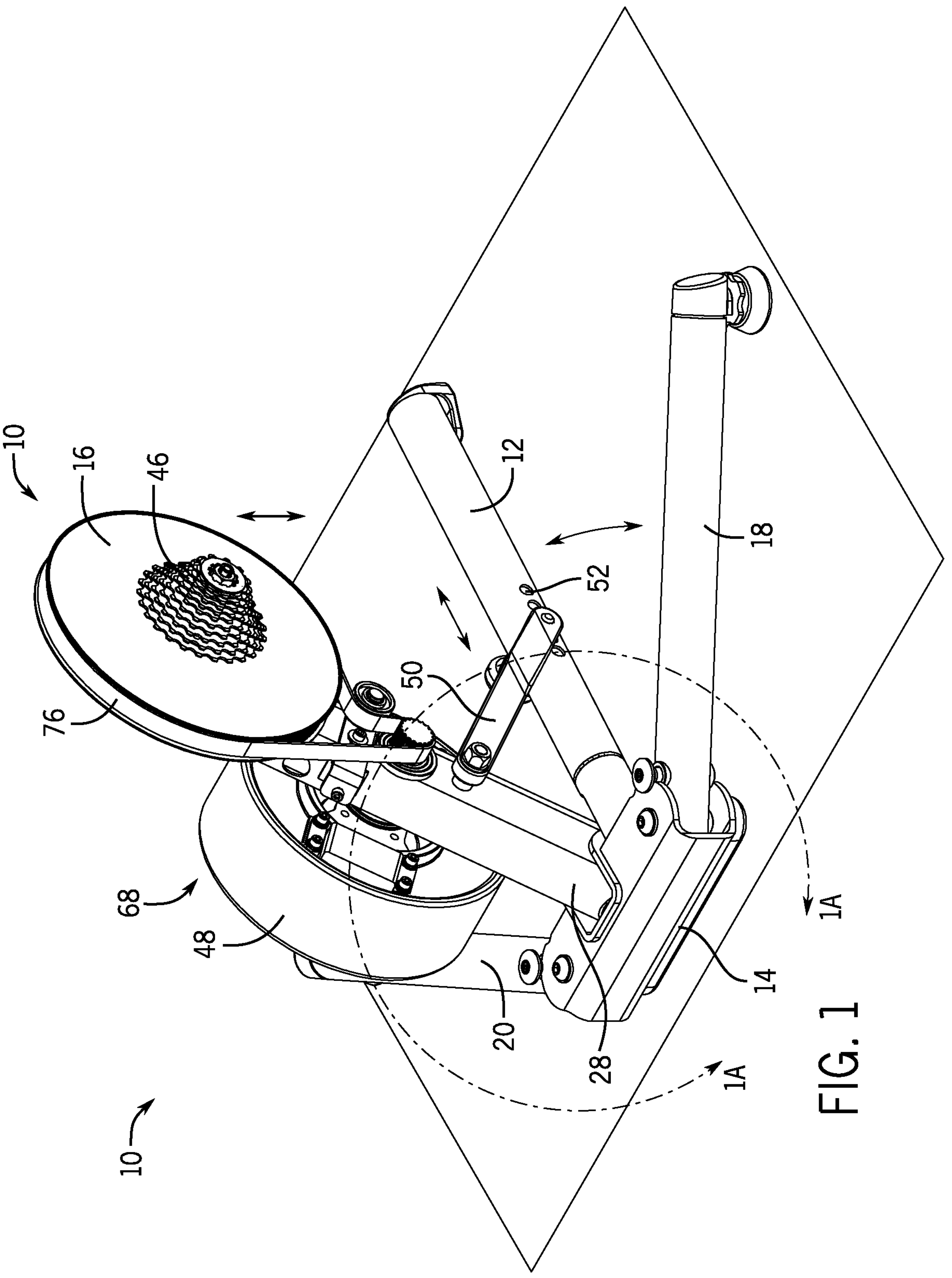
FIG. 1 is an isometric view of a trainer.

Aspects of the present disclosure involve a bicycle trainer that provides several advantages over conventional designs. The trainer includes a vertically adjustable rear axle and cassette (rear bicycle gears) where the user mounts her bicycle to the trainer. Generally speaking, the user removes her rear wheel from the drop outs at the rear of the bicycle (not shown) and then connects the rear axle and cassette of the trainer to the drop outs in the same manner that the rear wheel would be coupled to the bicycle. Additionally, the trainer is configured with a reversible spacer that allows for mounting bicycles, such as mountain bicycles and road bicycles, with different width rear wheels and attendant frame or hub spacing.

The cassette is coupled to a pulley that drives a belt connected to a flywheel or other resistance mechanism such that when the user is exercising, her pedaling motion drives the flywheel. The flywheel includes an electromagnetic brake that is controllable. Further, torque imparted on the flywheel by a rider pedaling a bicycle mounted on the trainer, is measured at a bracket interconnecting a portion of the flywheel with a stationary portion of the frame. Based on power measurements, RPM, heart rate and other factors, the magnetic brake may be controlled. Control of the trainer, and display of numerous possible features (power, RPM, terrain, video, user profile, heart-rate, etc.) may be provide through a dedicated device or through a smart phone, tablet or the like, running an app configured to communicate with the trainer.

More particularly and referring to FIGS. 1-7, a bicycle trainer 10 includes a center leg 12 coupled to and extending rearwardly from a front mounting bracket 14. The center leg 12 is arranged below a pulley 16 and offset slightly from a longitudinal centerline of the trainer 10. A pair of support legs 18, 20 is pivotally coupled to and at opposing ends of the bracket 14. The first and second support legs 18, 20 are configured to pivot inward toward the center leg 12 for storage and movement of the trainer 10, and pivot outward and away from the center leg 12 when the trainer 10 is in use.

Figure 3:
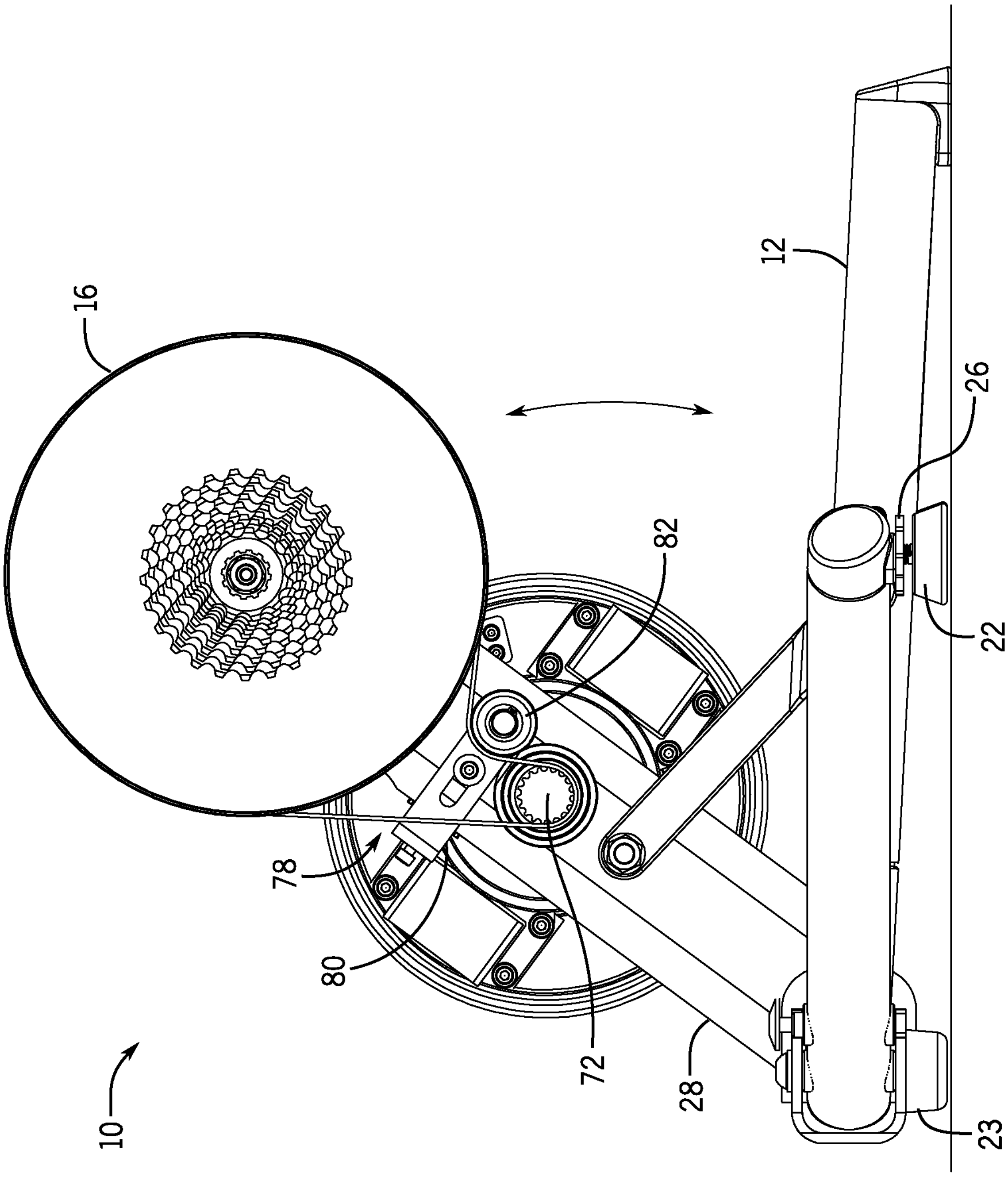
FIG. 3 is a left side view of the trainer in FIG. 1.
Figure 4:
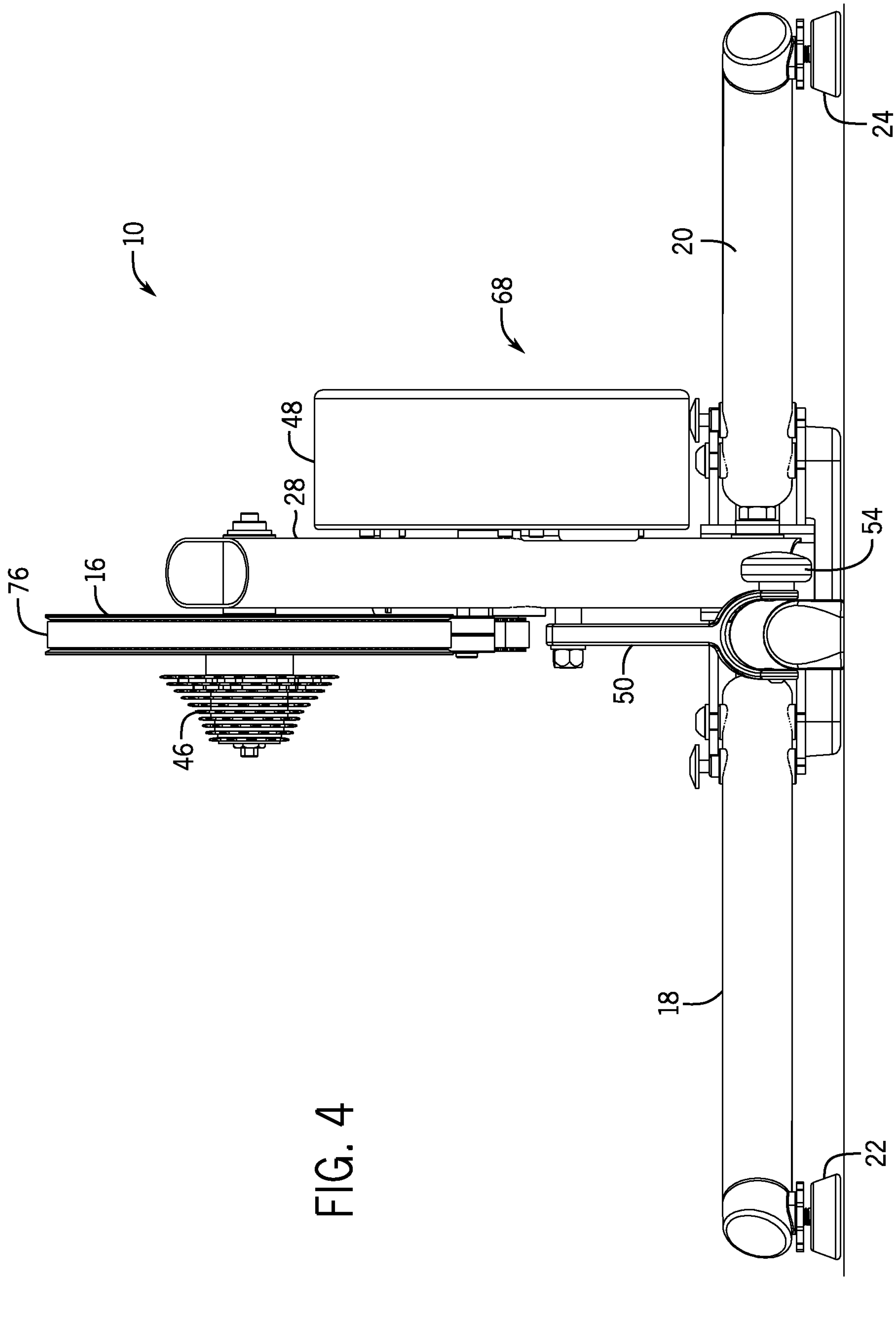
FIG. 4 is a rear view of the trainer of FIG. 1.
Figure 5:
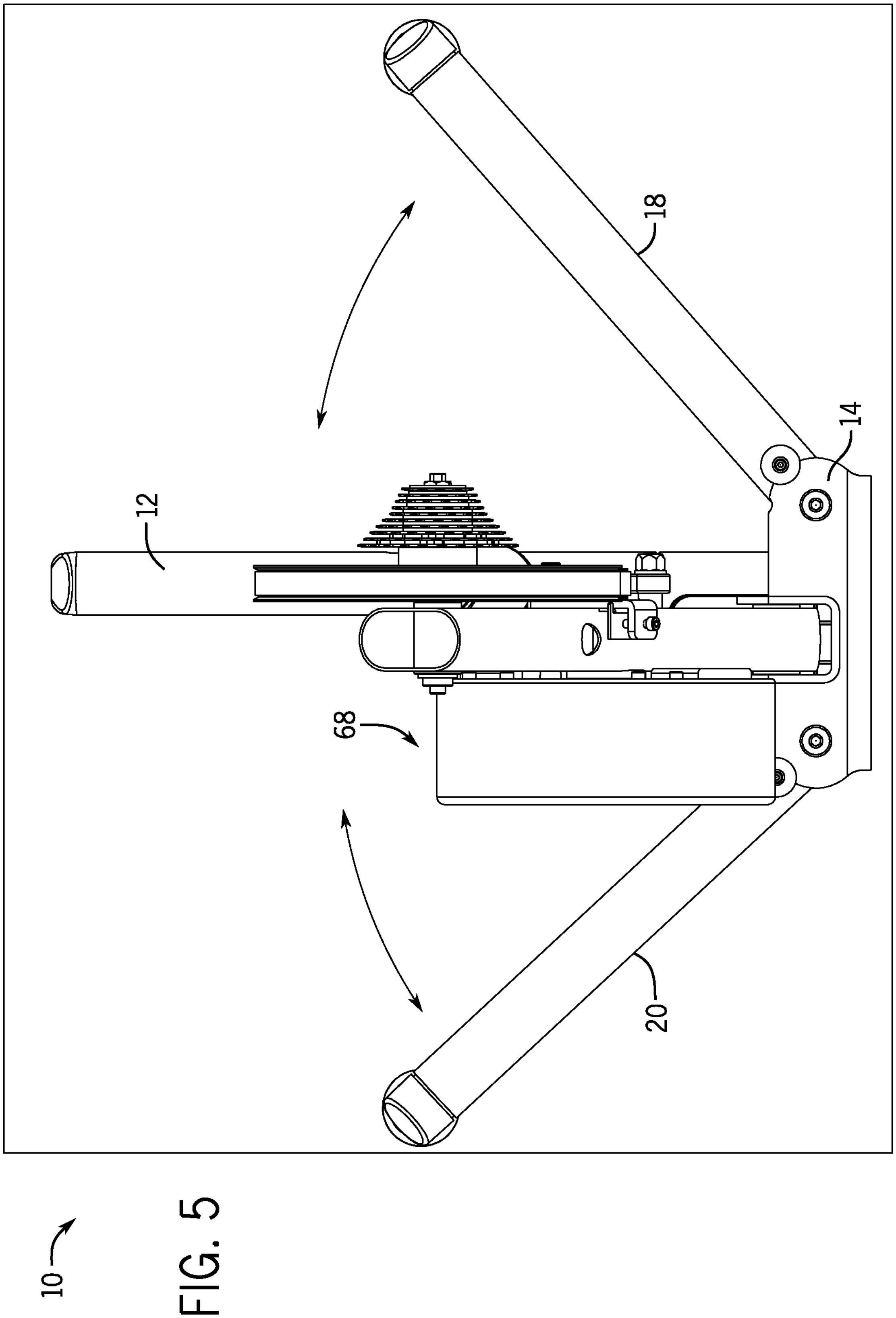
FIG. 5 is a top view of the trainer of FIG. 1.
Figure 6:
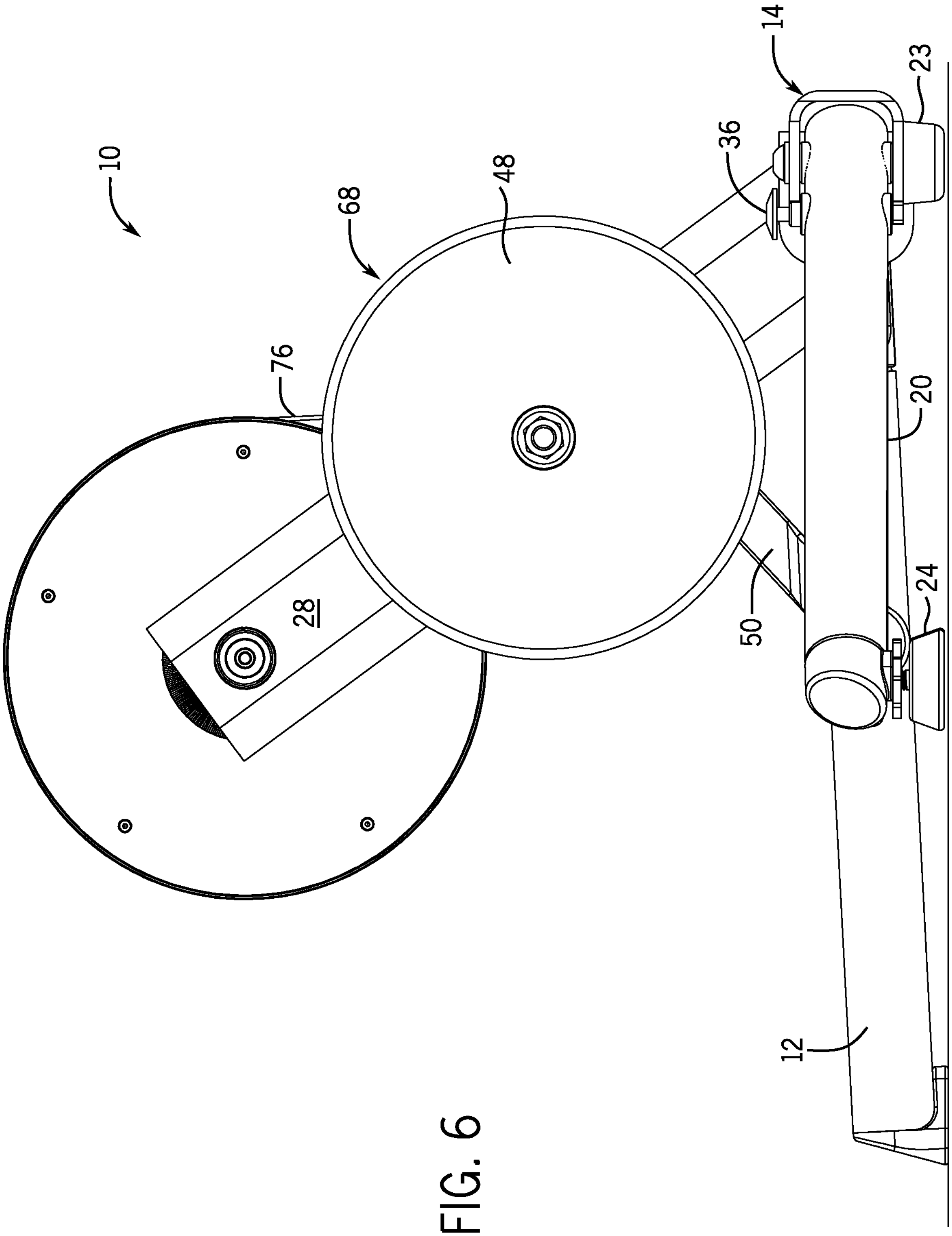
FIG. 6 is a right side view of the trainer of FIG. 1.
Figure 7:
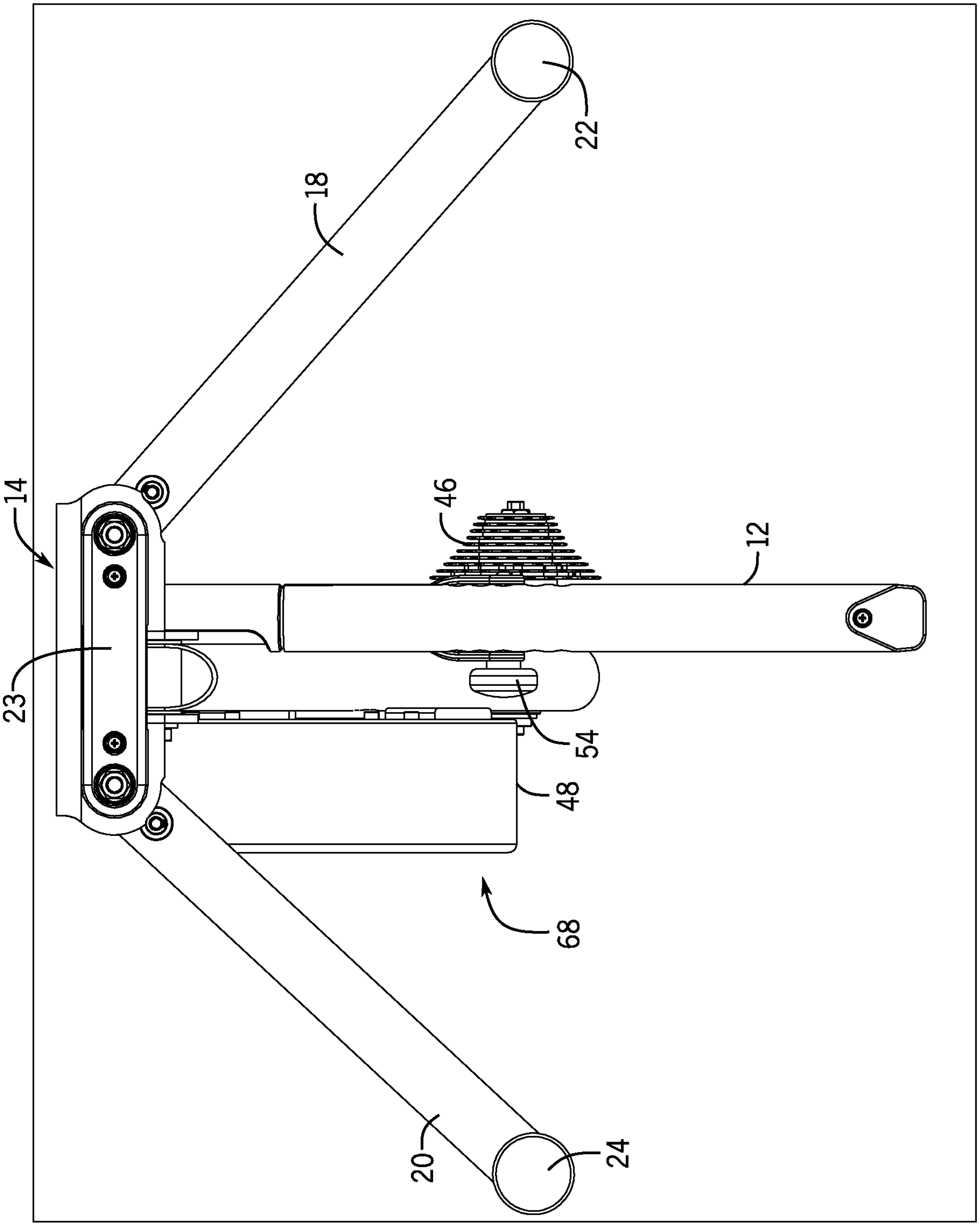
FIG. 7 is a bottom view of the trainer of FIG. 1.
Figure 8:
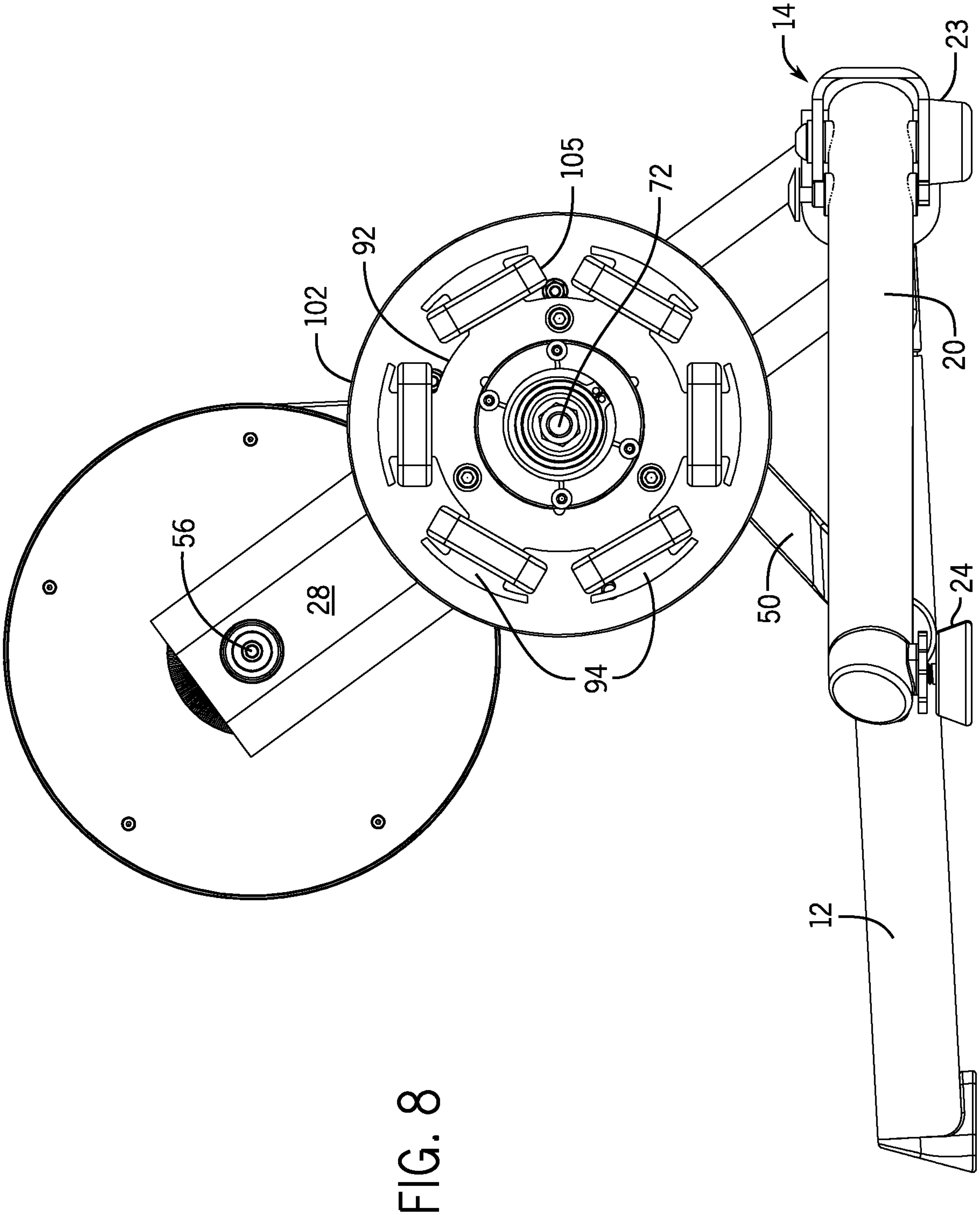
FIG. 8 is a right side view of the trainer of FIG. 1, with an outer flywheel portion of a flywheel assembly removed to illustrate internal components of the flywheel op view of the crank arm and power measurement device with various components hidden to illustrate internal components.

Distal the first and second pivotal connections with the bracket 14, first and second pads 22, 24 are coupled at an outer end of each of the respective first and second legs 18, 20. Additionally, an elongate pad 23 is coupled to a bottom side of the bracket 14. Each pad 22, 24 and leg 18, 20 functions in the same manner so the first pad 22 at the outer end of the first leg 18 is discussed in detail. Referring to FIG. 3, the pad 22 is adjustably mounted to the leg 18 to allow the trainer 10 to be leveled, transverse the longitudinal centerline, and thereby maintain the mounted bicycle in a side-to-side level orientation. While other alternatives are possible, in the example illustrated in the figures, the leg 18 defines a threaded aperture and the pad 22 is coupled with a threaded member that engages the aperture. An adjustment collar 26 is coupled with the threaded member such that rotation of the collar 26 causes the pad 22 to move vertically relative to the leg 18.

A main frame member 28 extends vertically and rearwardly from the mounting bracket 14. A plane in which the main frame member 28 pivots is oriented at a about a right angle relative to a plane in which the legs pivot. Accordingly, in one possible implementation, a bubble level 30 (shown in FIG. 2) is mounted within a recess in the main frame member 28. The bubble level 30 is mounted parallel with the plane in which the legs 18, 20 pivot. Thus, when the bubble 30 reads level, the main frame member 28 is vertical or otherwise perpendicular to the plane defined by the legs 18, 20. In such an orientation, any bicycle mounted to the axle will be straight, and not lean to the left or right. With such an integrated level, a user can quickly and easily adjust the pads 22, 24 on one or both legs and thereby level the trainer 10, even on an uneven or slanted surface.

Figure 1A:
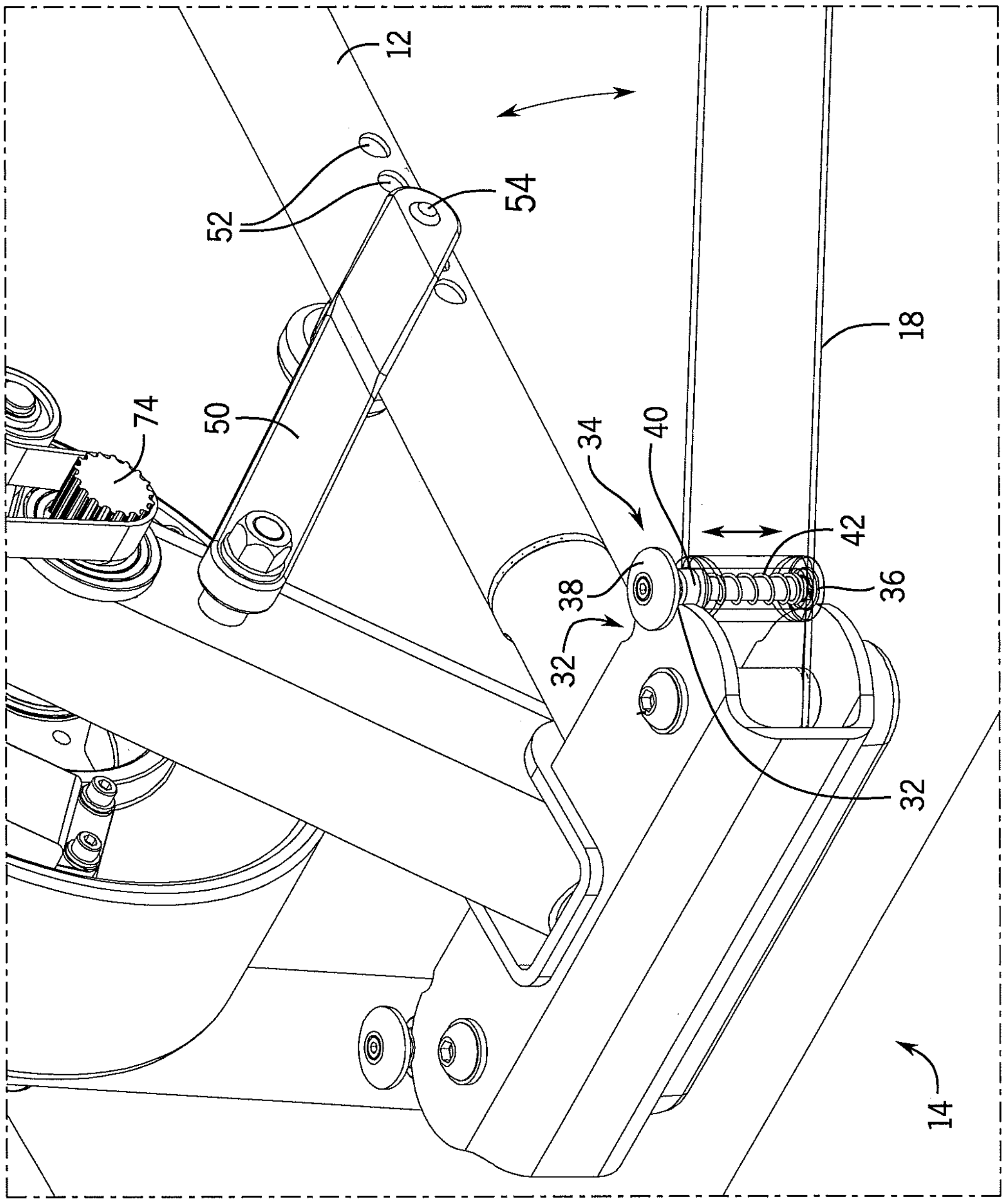
FIG. 1A is a zoom area view of a portion of the trainer illustrated in FIG. 1A with a first leg of the trainer made transparent so as to illustrate internal components of a retention assembly that is used to lock the leg in a folded or use position.

Referring to FIG. 1A, adjacent each pivot, the front mounting bracket 14 defines an upper arcuate surface with a pair of notches 32 corresponding to an inwardly pivoted configuration of the leg 18, 20, and an outwardly pivotal (as shown) configuration of the leg 18, 20. A retention assembly 34 is coupled with the leg adjacent the upper arcuate surface and notches 32. The retention assembly 34 includes a spring loaded pin 36 with a user engageable head 38. The pin 36 supports a collar 40 that fits within the notches 32. By depressing the pin 36 against the spring 42, the collar 40 moves downwardly into a recess defined in the leg 18, 20 and disengages the respective notch 32. The leg may then be pivoted inwardly or outwardly, and when the user releases the pin 36, the spring 42 nudges the pin 36 upward causing the collar 40 to engage one of the respective notches 32 securing the leg 18, 20 in the desired position.

Figure 2:
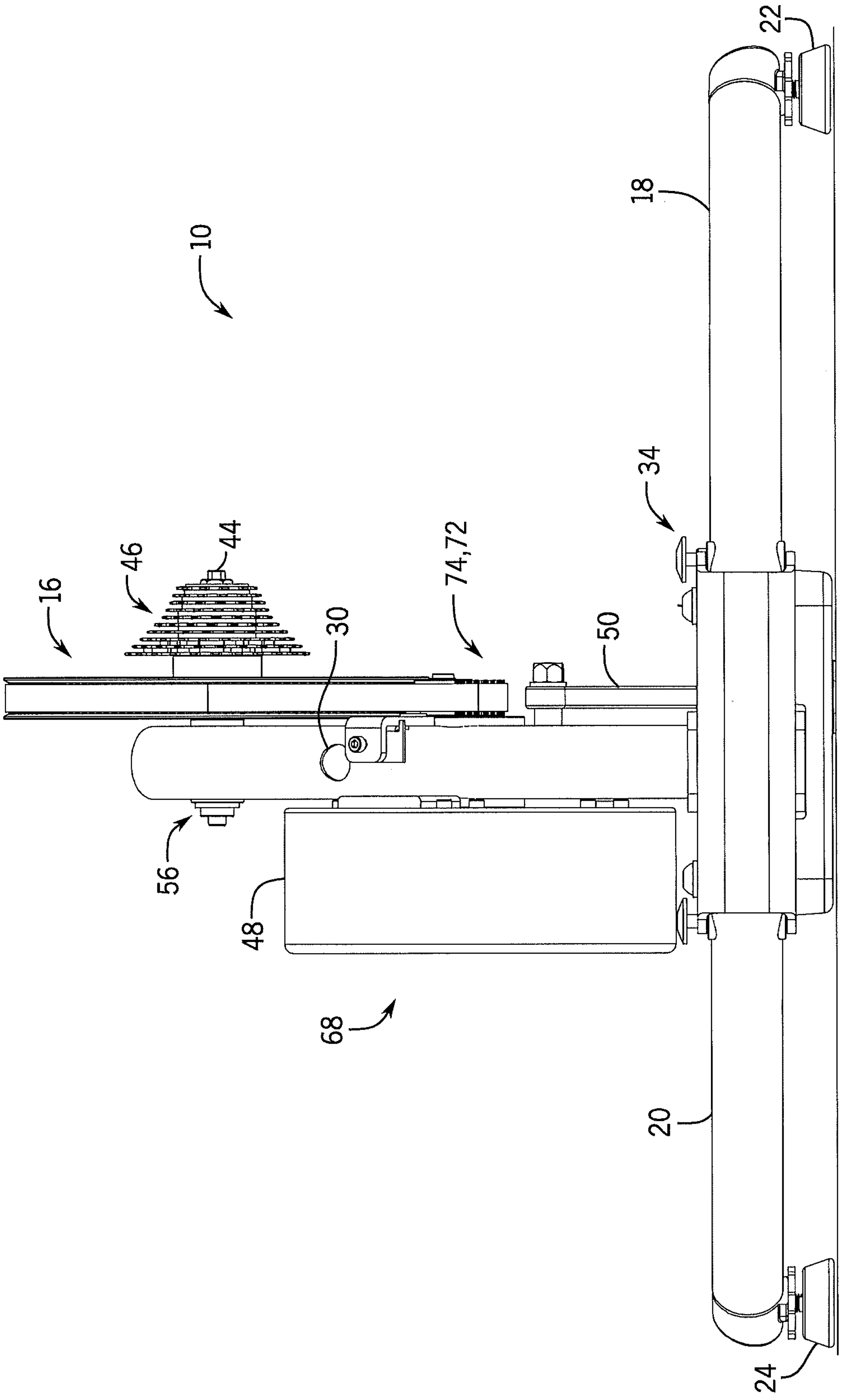
FIG. 2 is a front view of the trainer of FIG. 1.

Referring to FIGS. 1 and 2, among others, the pulley 16, an axle 44, a cassette 46, a flywheel 48 and other components are supported by the main frame member 28 extending rearwardly and upwardly from the pivot mount bracket 14. The main frame member 28 is pivotably mounted to the pivot mount bracket 14 to adjust the height at which a bicycle is supported. Thus, the main frame member 28 may be pivoted upwardly or downwardly relative to the orientation illustrated in the drawings to vertically adjust the height of the bicycle.

A height adjustment bracket 50, as seen up-close in FIG. 1A, is coupled between the main frame member 28 and the center leg 12 to maintain the main member 28 in a desired height. More specifically, at a rearward end, the adjustment bracket 50 includes a u-shaped portion defining opposing members that are arranged on either side of the center leg 12. Each member defines an aperture. The center leg 12 defines a plurality of apertures 52 along its length that are configured to receive a pin 54 that extends through the opposing member apertures and one of the pluralities of apertures 52 in the center leg 12. In the illustrated example, the aperture opposite the portion of the pin that includes a handle portion is threaded. Similarly, the end of the pin, opposite the handle, is also threaded. By fixing the bracket 50 with one of the plurality of apertures 52 along the center leg 12, a user can raise or lower the main member 28 thereby raising or lowering the axle 44 to which the bicycle is mounted.

Other mechanisms are also possible to secure the bracket 50 to the center leg 12, as well as to elevate the center leg 12. For example, a telescoping vertical member pivotally coupled with the main frame member 28 might be used to adjust the height of the main member 28 and fix the height at a certain location by fixing the amount telescoping. The height adjustment bracket 50 might include one or a pair of pop pins 37 to secure the u-bracket relative to the apertures in the center leg.

Figure 2A:
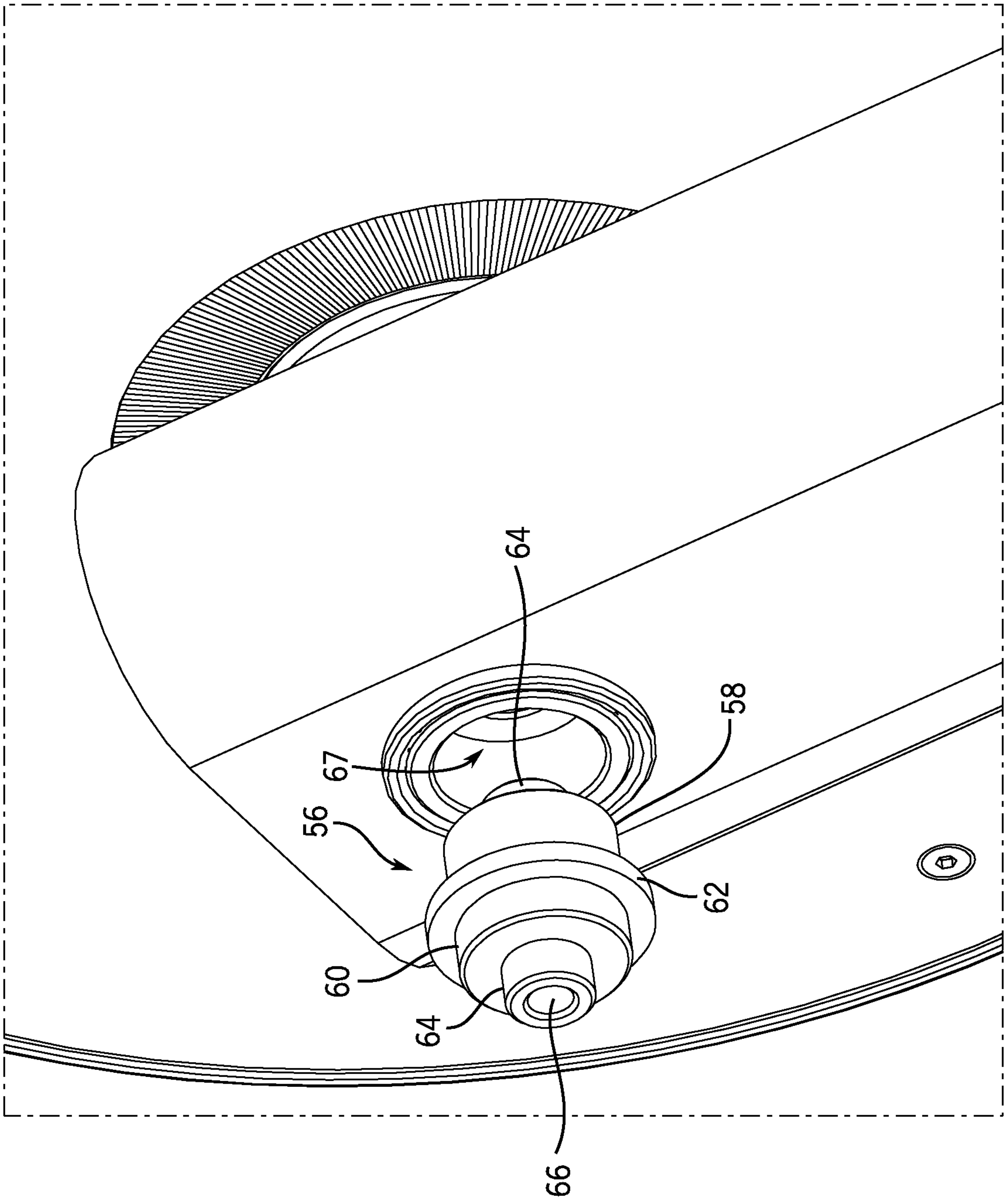
FIG. 2A is an isometric view of a two-sided spacer that may be employed to mount different size and types of bicycles to the trainer.

Turning now to mounting a bicycle to the trainer 10, and referring to FIG. 2A, the trainer 10 may be converted for use with bicycles having different sized wheels, chain stay, dropout, and/or axle spacing to accommodate differences in width between typical mountain bikes and road bikes. Generally speaking, road bikes have narrower axle spacing (and wheels and rims) compared to the axle spacing on mountain bikes. In some implementations, such as shown in FIG. 2A, the trainer 10 may include a two-sided axle spacer 56 that allows a user to elegantly covert the trainer between use with a road bike and mountain bike, or other sizes, without use of a tool. The trainer 10 includes the two-sided spacer 56 that is at the end of the axle 44 (opposite the cassette 46), and which can be reversed depending on what type of bicycle (and its hub) that is being mounted on the trainer. A quick release axle (not shown) extends through the reversible spacer 56 to hold it, as well as the bicycle, in place and on the trainer 10 when the trainer 10 is in use.

Referring still to FIG. 2A, the two-sided spacer 56 includes a relatively longer cylindrical spacer section 58 adjacent a relatively shorter spacer section 60. The spacer sections 58, 60 are separated by a collar 62 that ensures correct positioning of the spacer 56 by limiting a depth that the spacer 56 is received within an aperture 67 defined in the main member 28. Extending from each spacer section 58, 60 is a dropout mount 64 that is dimensioned to be received in a dropout on a bicycle. The bicycle dropout may be mounted directly on the dropout mount 64, both of which are secured to the trainer 10 by the quick release axle. As shown, an aperture 66 is defined through the spacer 56, which receives the quick release axle. The aperture 67 in the main frame 28 is sized to receive the shorter and longer spacer sections 58, 60. The depth of the aperture 67 in the frame is at least as deep as the longer of the spacer sections 58, 60. Thus, both the longer and the shorter spacer sections 58, 60 fit within the aperture 67. Additionally, by inserting the spacer sections 58, 60 into the frame aperture 67, the spacer 56 is securely held on the bike frame. Thus, when a user is mounting a bicycle, the spacer 56 is held securely on the frame making bicycle mounting easier for the rider. In the orientation shown, when the spacer 56 is inserted in the main frame aperture 67, the shorter spacer section 60 extends from the main frame 28 and the collar 62 abuts the main frame 28. The dropout from a road bike being mounted on the trainer 10 is placed over the dropout mount 64 extending from the shorter section 60. To mount a mountain bike, the spacer 56 is reversed so that the relatively longer spacer section 60 extends from the main frame 28. Similarly, the collar 62 abuts the main frame wall thereby ensuring that the spacer 56 is properly positioned, and the mountain bike dropout is mounted on the dropout mount 64 extending from the relatively longer spacer section 58.

As introduced above, the main frame member 28 supports the flywheel assembly 68. Unlike conventional flywheel assemblies 68, the present assembly is particularly configured to allow for power measurement. Generally speaking, the trainer 10 determines the amount of power being expended by the rider while pedaling by measuring the torque on a member of the flywheel assembly 68. Torque may be measured through a strain gauge 70 mounted on the member, and the torque on the member may be translated into a wattage measurement reflective of the amount of power expended by the rider.

More particularly and referencing FIGS. 1, 8-10, and others, the flywheel assembly 68 along with the components used for measuring power are now discussed in more detail. The flywheel assembly 68 includes an outer relatively heavy flywheel member 48 that is configured to rotate relative to a plurality of internal components that are substantially fixed relative to the outer rotatably flywheel member 48. The flywheel member 48 is coupled with a flywheel axle 72 that communicates through and is rotatably supported by the main member 28. The flywheel axle 72 also includes a second flywheel pulley 74 that rotates in conjunction with the first flywheel pulley 16 through a belt 76. The belt 76 interconnects the pulleys 16, 74 and may include teeth that correspond to teeth on the first and second pulleys 16, 74. In the depicted arrangement, a user's pedaling force is translated through the belt from the first larger pulley 16 to the second pulley 74 supported on the flywheel axle 72, which in turn causes the flywheel member 48 to rotate.

A belt tensioner assembly 78 is mounted on the main frame 28 and is used to mount and remove the belt 76 to and from the pulleys 16, 74, and also to adjust the tension of the belt 76 for proper function. The belt tensioner bracket 80 is generally L-shaped and supports a tensioner wheel on the end of a longer side of the bracket. The belt is positioned around the tensioner wheel 82, and by adjusting the tensioner wheel 82 fore and aft, the tension on the belt 76 can be increased or decreased. Adjacent the tensioner wheel 82, the bracket 80 defines an elongate aperture 84 through which is positioned a locking bolt 86 mounted to the main frame 28. When the bracket 80 and tensioner wheel 82 are positioned in the appropriate fore/aft position, the bolt 86 is tightened thereby locking the bracket 80 and wheel 82 in place. Finally, on a short portion of the bracket 80, an adjustment screw 88 is connected with a front face of the main frame 28 and through a threaded adjustment aperture in the short portion of the bracket 80. While the bolt 86 is loosened, the adjustment screw 86 may be used to move the bracket 80 fore or aft.

The flywheel member 48 is fabricated partially or wholly with a ferrous material or other magnetic material. The fixed internal components of the flywheel assembly 68 may include a plurality of electromagnetic members 105 mounted on a core 92, and provide a magnetic flywheel brake. In some arrangements, the magnetic brake may be computer controlled thereby dynamically adjusting the braking force to simulate any possible riding profile. In the illustrated example, the core 92 defines six T-shaped portions 94 extending radially from an annular main body 96. A conductor 98, such as copper wiring, is wound around a neck of the T-shaped portions 94 between the upper portion of the T and the annual or core 92. The wire may be continuous so that a consistent current flows around each T-shaped portion 94, core 92; a consistent and electromagnet force is generated uniformly around the core 92. Collectively, the T-shaped portions 94 and wound wiring can generate a magnetic field that magnetically couples with the flywheel member 48. The trainer includes a processor 100 and associated electronics that allow for the control of a current through the wires thereby inducing a controllable magnetic field from the T-shaped portions 94. Since the flywheel member 48 is magnetic, by varying the strength of the magnetic fields, the amount of braking force resisting rotation of the flywheel 48 may also be varied.

Turning now more specifically to the mechanisms by which power is measured, the various rotationally fixed portions of the flywheel assembly 68 are connected directly, or indirectly, to a mounting plate 102 adjacent the main member 28. The mounting plate 102 is rotatably mounted to a tubular member 104 supported by the main frame member 28. The flywheel axle 72 extends through the center of the tubular member 102; therefore, the flywheel member 48 is coaxial with the mounting plate 102. While the mounting plate 102 is rotationally mounted, it is rotationally fixed by a torque bracket 106 connected between the main frame member 28 and the mounting plate 102. Generally speaking, a strain gauge assembly 70 is mounted on the torque bracket 106. Because the torque bracket 106 couples the main frame member 28 to the mounting plate 102, when rotationally forces are transferred between the flywheel member 48 and the rotationally fixed components (e.g., magnets) 105, those forces exert a torque on the torque bracket 106 which is detected by the strain gauge assembly 70. Without the torque bracket 106, the entire flywheel assembly 68 would rotate about the flywheel axle 72 rather than only the external flywheel member 48 is that is fixed to the flywheel axle 72. Thus, the pedaling force exerted by the rider translates through the flywheel assembly 68 and is measured at the torque bracket 106 that resists the rotationally torque exerted on the flywheel 48.

Figure 9A:
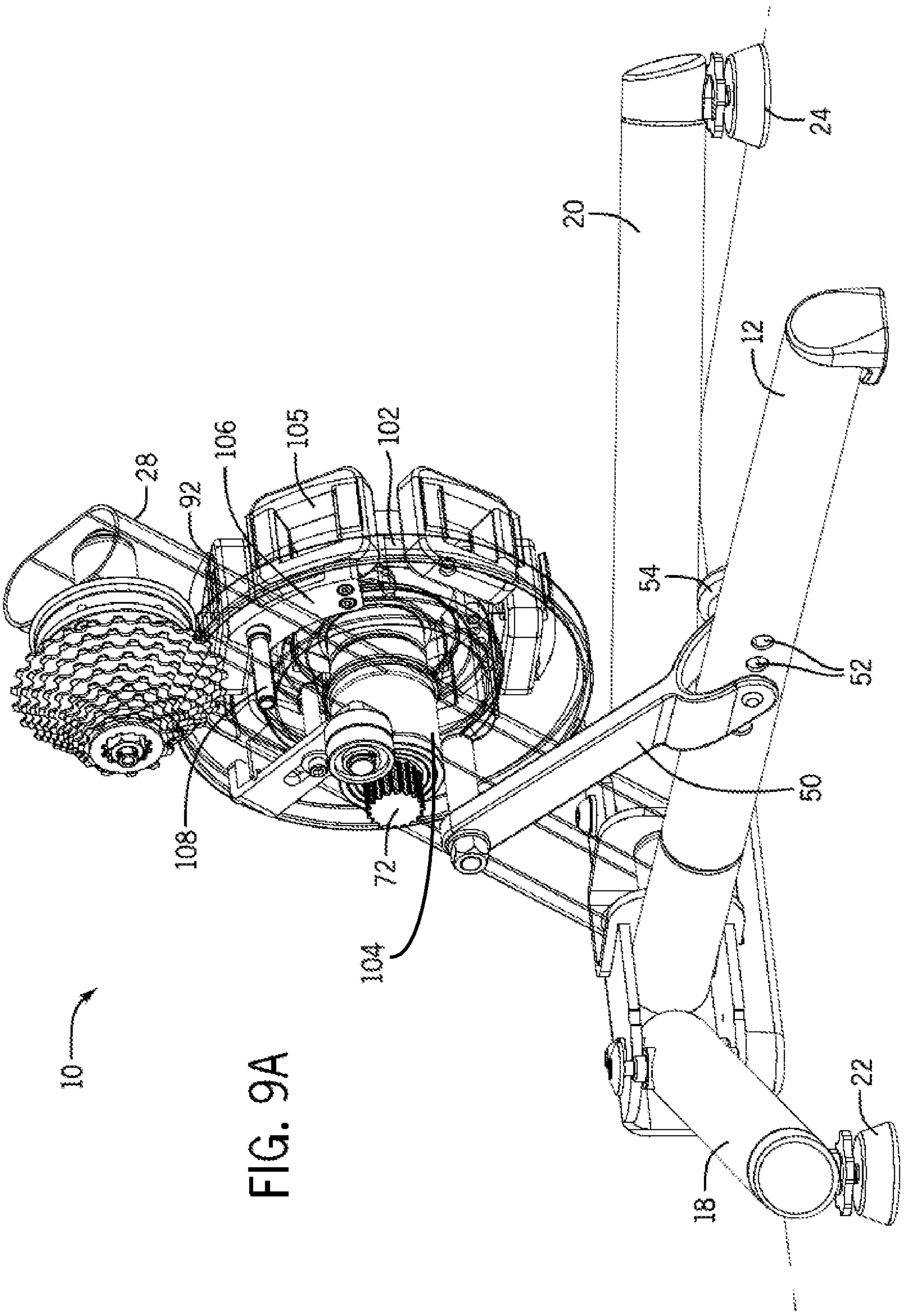
FIG. 9A is a first rear isometric view of the trainer with several components hidden or transparent to better illustrate internal components of the flywheel assembly that fix the electromagnetic components and others in place relative to the spinning flywheel portion and also provide for power measurement.
Figure 9B:
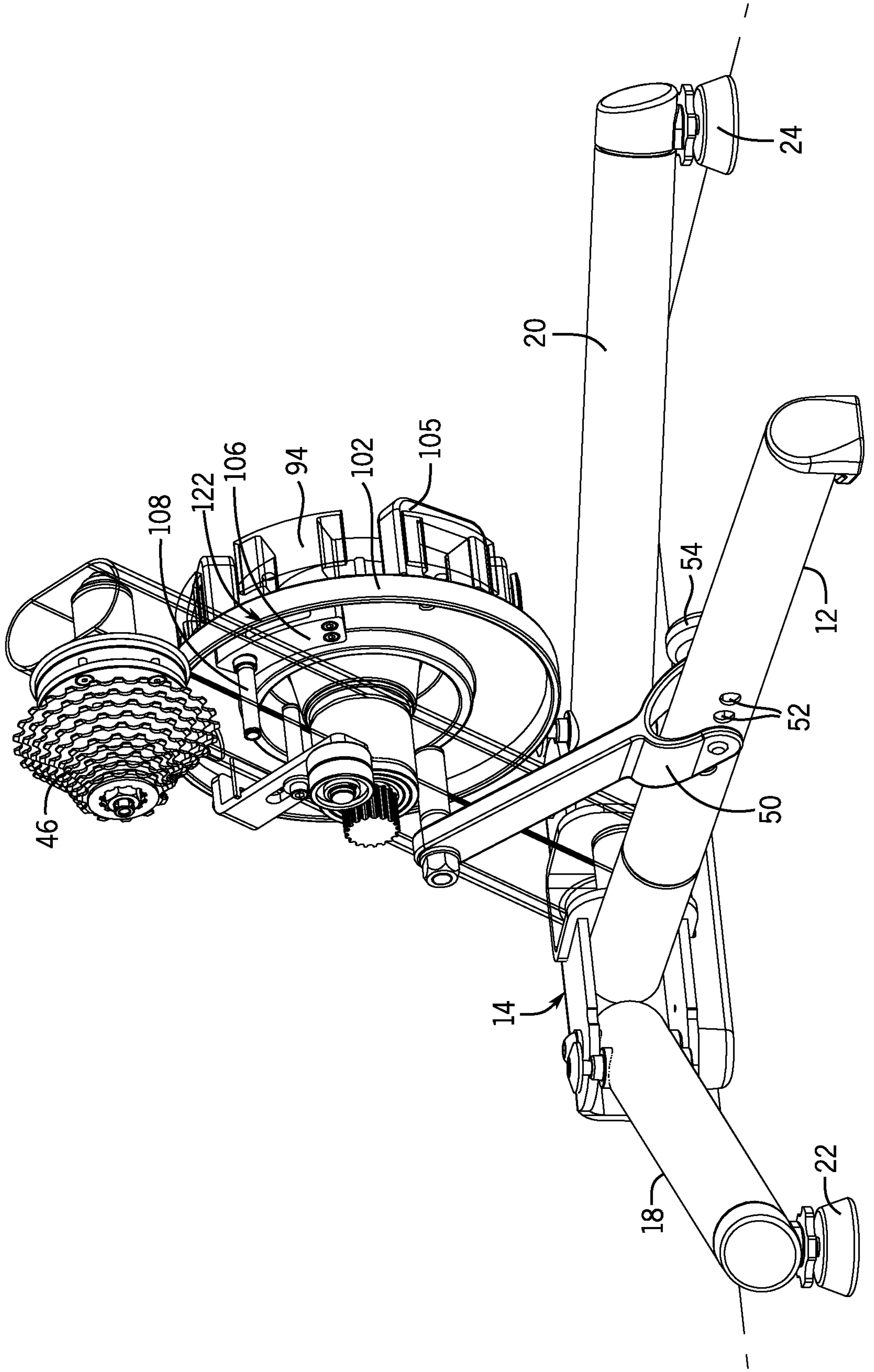
FIG. 9B is a second rear isometric view of the trainer with several components hidden or transparent to better illustrate internal components of the flywheel assembly that fix the electromagnetic components and others in place relative to the spinning flywheel portion and also provide for power measurement.
Figure 10:
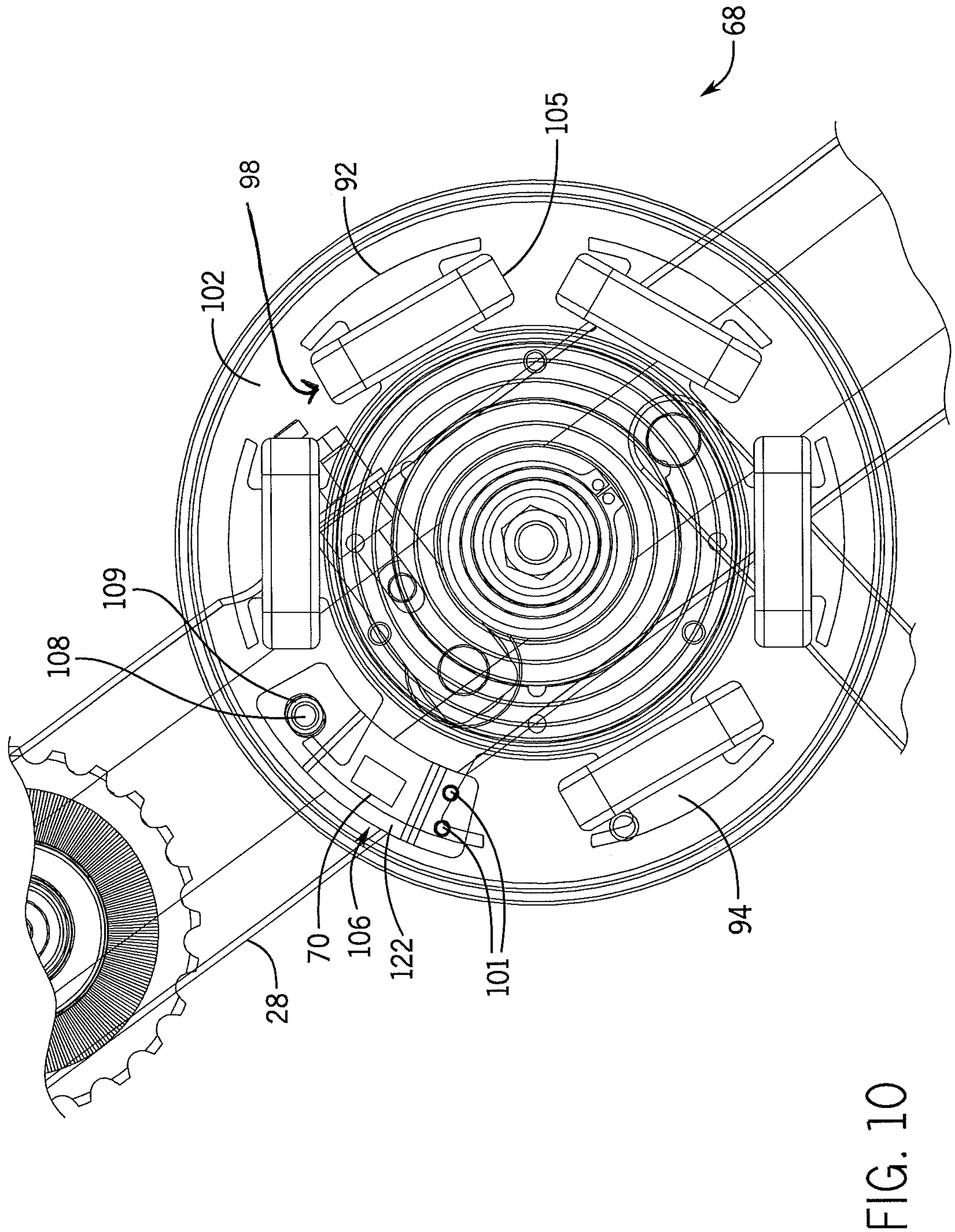
FIG. 10 is a right side view of the trainer with several components hidden or transparent to better illustrate internal components of the flywheel assembly that fix the electromagnetic components and others in place relative to the spinning flywheel portion and also provide for power measurement.
Figure 11:
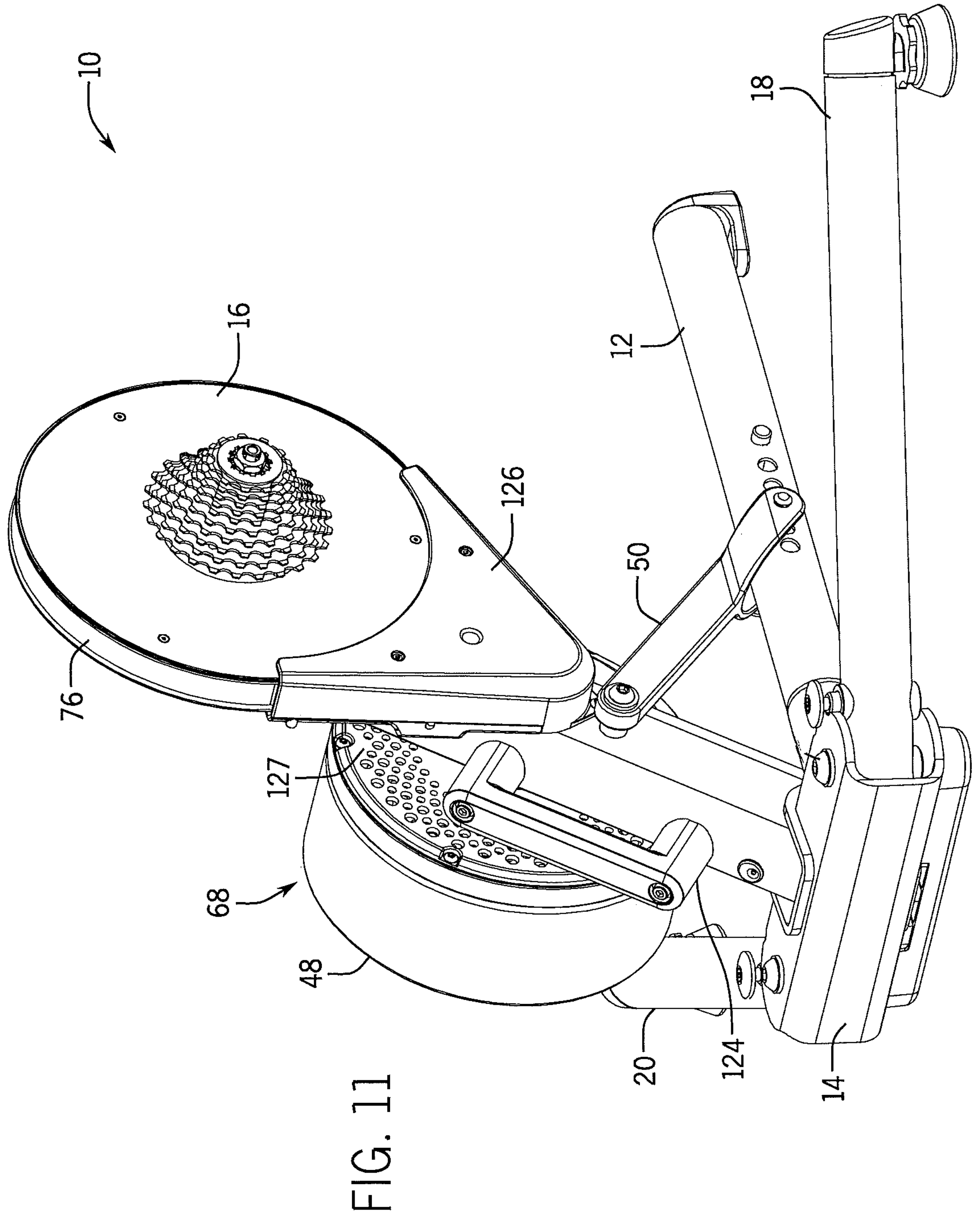
FIG. 11 is an isometric view of a second trainer conforming to aspects of the present disclosure.

More specifically and referring primarily to FIGS. 9A, 9B, and 10, the torque bracket 106 is arcuate and defines a radius generally along a matching radius of the mounting plate 102. A mid portion, between each end, of the torque bracket 106 is machined and has a strain gauge assembly 120 mounted thereon. One end of the torque bracket 106 defines an aperture through which in a pin 108 extends, the pin 108 is fixed with the main frame 28. A bushing 109 may support the pin 108 with the torque bracket aperture. A bushing 109 may also be included at the main frame 28. In either case, at least one end of the pin 108 is floating within a bushing. Thus, the pin 108 resists the rotation of the flywheel 48. However, while the pin 108 may be fixed without any bushings 109, by using one or more bushing 109 or other equivalent mechanisms, no unwanted stresses or strains are placed on the pin 108. At an opposing end of the torque bracket 106, the bracket 106 is secured to the mounting bracket 102 by bolts 101 or otherwise secured to the mounting plate 102. Thus, the mounting plate 102 is rotatably fixed through a combination of the pin 108 fixed to the main member 28, the torque bracket 106 connected with the pin 108, and the torque bracket 106 coupled with the mounting plate 102. Accordingly, when the flywheel 48 mounted with the flywheel axle 72 is rotated by a user, the rotational force is translated to the flywheel mounting plate 102. The torque bracket 106, which is the only member resisting the rotational movement, deflects or is otherwise, placed in tension or compression. The strain gauge assembly 120 detects the deflection and that deflection is translated into a power measurement. The torque arm 106 may be positioned in other alternative locations between the flywheel 48 and some fixed portion of the trainer 10.

In one particular implementation, a display 110 is wirelessly coupled with a processor 100 that receives the strain gauge 70 measurement and calculates power. The display 110 may wirelessly receive power data and display a power value. The display 110, being wireless, may be mounted anywhere desirable, such as on a handlebar. The display 110 may also be incorporated in a wrist watch or cycling computer. The power data may also be transmitted to other devices, such as a smart phone, tablet, laptop, and other computing device for real-time display and/or storage.

In the example implementation shown herein, a power measurement device 112 is mounted on an inner wall of the brake assembly portion of the flywheel 48. Alternatively, the power measurement device 112 along with other electronics may be mounted within a cap 114 at the top of the mainframe member 28. The power measurement device 112 may include a housing 116 within which various power measurement, and other electronics are provided, including a Wheatstone bridge circuit 118 that is connected with the strain gauge assembly 120 on the torque bracket 106, and produces an output voltage proportional to the torque applied to the bracket 106. The output is sent to a processor 100, such as through wires or wirelessly, that is mounted within the end cap 114 or as part of the power measurement device 112, or otherwise. In various possible other implementations, the housing 116 and/or the strain gauge assembly 120 may also be secured to other portions of the torque arm 106. The strain gauge assembly 120 may involve one or more, such as four, discrete strain gauges 70. When compression tension forces are applied to the gauges 70 the resistance changes. When connected in a Wheatstone circuit 118 or other circuit, a voltage value or other value proportional to the torque on the bracket 106 is produced.

Within the recessed portion of the torque arm 106, one or more strain gauges 70 may be provided. Generally speaking, the torque member 106 will be stretched to varying degrees under correspondingly varying forces. The strain gauges 70 elongate accordingly and the elongation is measured and converted into a power measurement. In one particular implementation, the strain gauges 70 are glued to a smooth flat portion of the torque member 106, such as the machined area 122. While a machined or otherwise provided recess 122 is shown, the power measurement apparatus may be applied to a bracket with little or no preprocessing of the bracket. The machined portion 122 helps protect the strain gauge from inadvertent contact and amplifies the strain measurement. The machined recess 122 is provided with a smooth flat bottom upon which the strain gauges 70 are secured. To assist with consistency between torque members 106 and thereby assist in manufacturing, a template may be used to apply the strain gauge 70 to the surface within the machined recess 122. Alternatively, the strain gauge 70 may be pre-mounted on a substrate in a desired configuration, and the substrate mounted to the surface. The side walls of the machined recess 122 also provide a convenient way to locate the housing 116.

FIGS. 11-17 illustrate an alternative trainer 10 conforming to aspects of the present disclosure. The trainer 10 functions and operates in generally the same manner as the embodiment illustrated in FIGS. 1-10, with some variations discussed below. Overall, the trainer 10 has a pivot mount bracket 14 at the front of the device 10. A first leg 18 and a second leg 20 are each pivotally mounted to the mount bracket 14. The legs 18, 20 may be folded out for use (as shown) or folded in for transportation and storage. A retention assembly 34 is positioned adjacent each pivot to hold the respective leg in either position.

A main frame member 28 extends upwardly and rearwardly from the pivot mount bracket 14. Adjacent to the main frame member 28, a center leg 12 extends rearwardly from the main frame member 28. A pulley 16, rotatably mounted to the main frame 28 and to which an axle 44 and cassette 46 are coupled, is positioned above and in generally the same plane as the center leg 12. Therefore, when the bicycle is mounted on the axle 44 and its chain is placed around the cassette 46, the bicycle is positioned generally along the center of the trainer 10 which falls between the main frame 28 and center leg 12.

To adjust the height of the main member 28 and thereby adjust the height of the rear of any bicycle connected with the trainer 10, a height adjustment bracket 50 is pivotally mounted with the main member 28 and adjustably connected with the center leg 12. More particularly, the adjustment bracket 50 may be pinned at various locations along the length of the center leg 12, the further forward the bracket is pinned, the higher the main member 28 and the further rearward the bracket 50 is pinned, the lower the main member 28.

The trainer 10 may include a handle member 124 coupled with a front wall of the main member. A user may use the handle 124 to transport or otherwise lift and move the trainer 10. In the example shown, the handle 124 is bolted to the main member 28 at either end of the handle. Other handle forms are possible, such as a T-shaped member, an L-shaped member bolted at only one end to the main frame, a pair of smaller handles on either side of the main member as opposed to on the front facing wall of the main member as shown, a pair of bulbous protrusions extending from the sides of the main member and/or the front face of the main member 28, among others.

Figure 12:
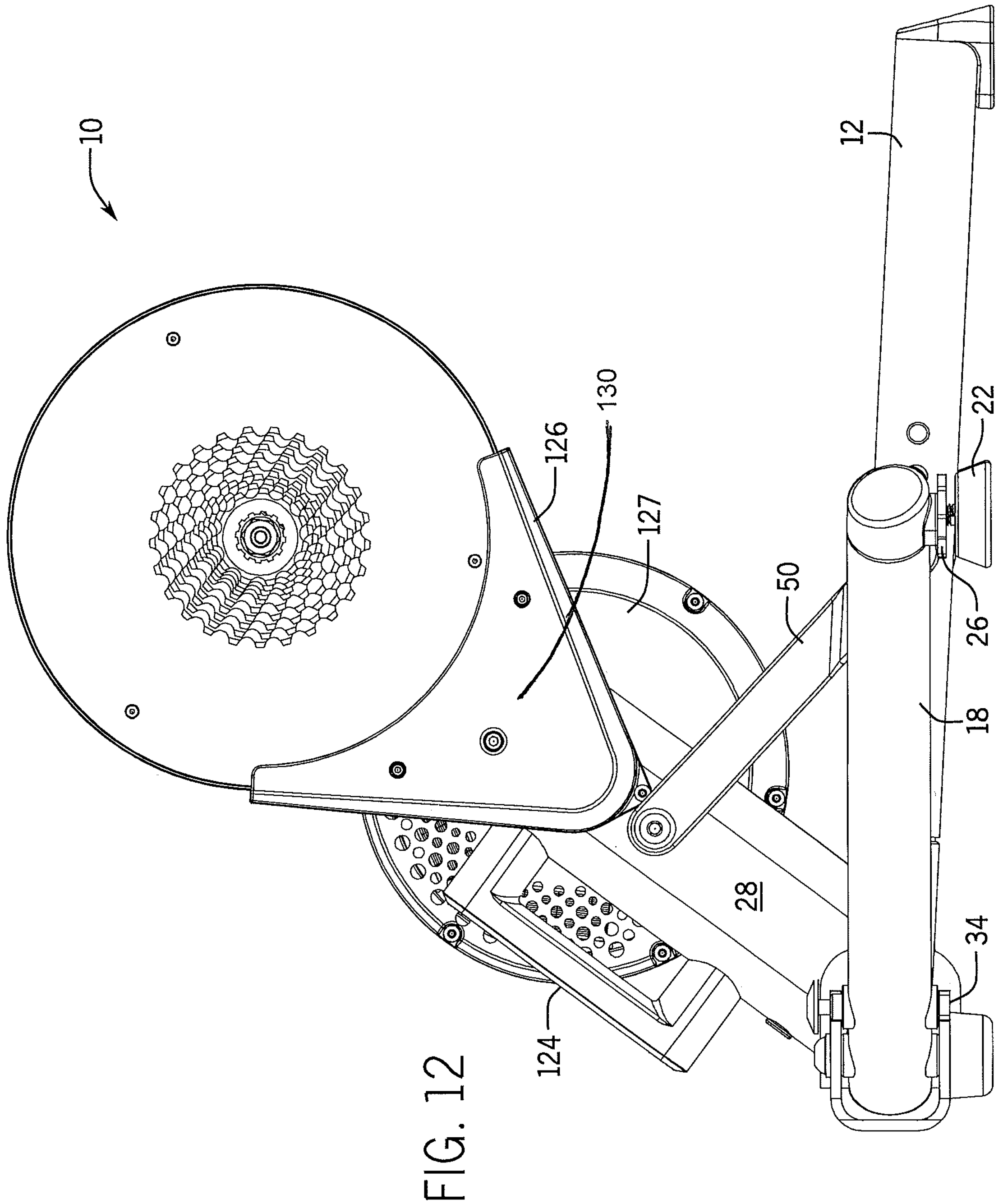
FIG. 12 is a left side view of the trainer shown in FIG. 12.
Figure 13:
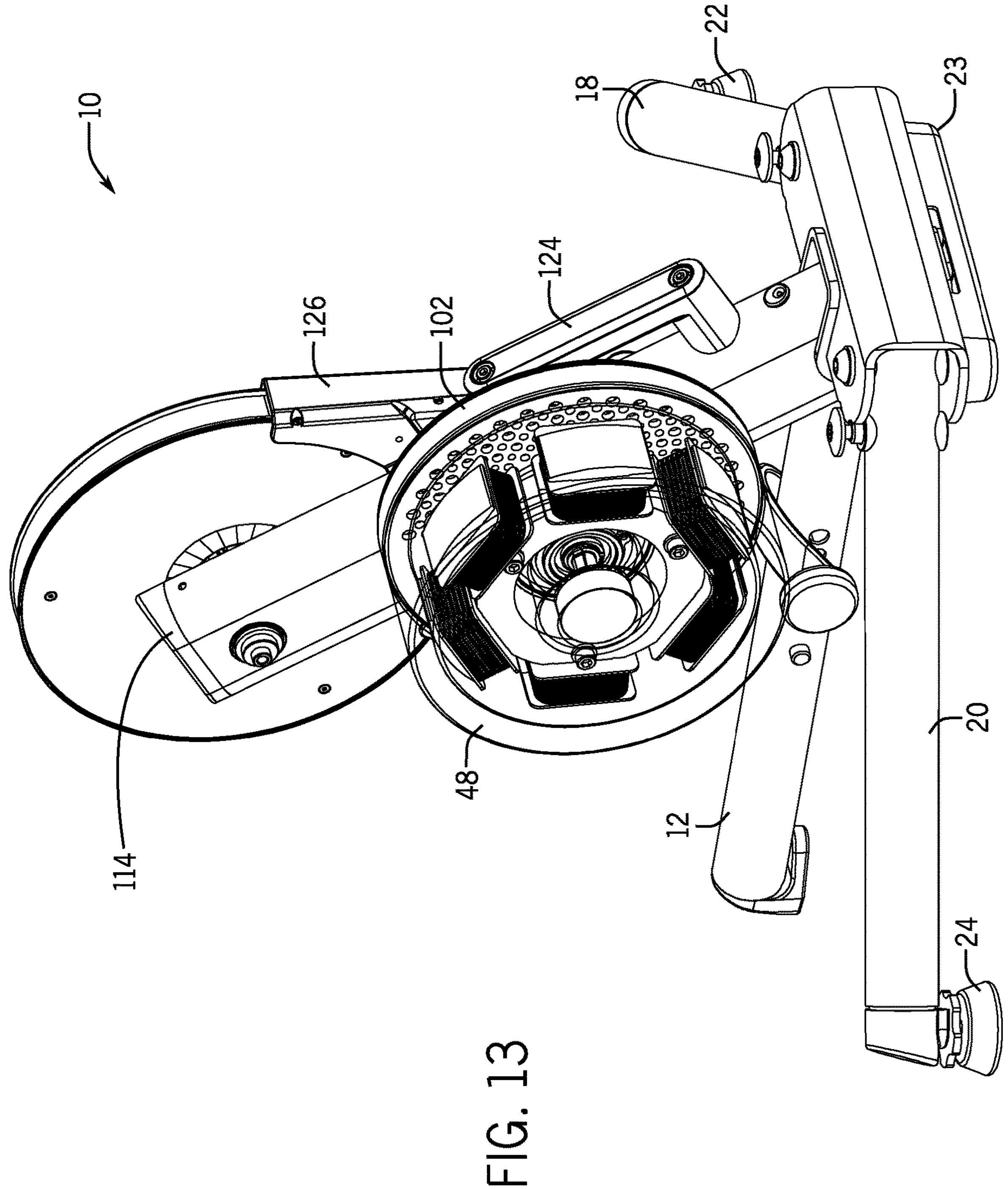
FIG. 13 is a front isometric view of the trainer shown in FIG. 12, the view of FIG. 13 providing the flywheel in transparent view to illustrate various components of an internal flywheel brake assembly.
Figure 14:
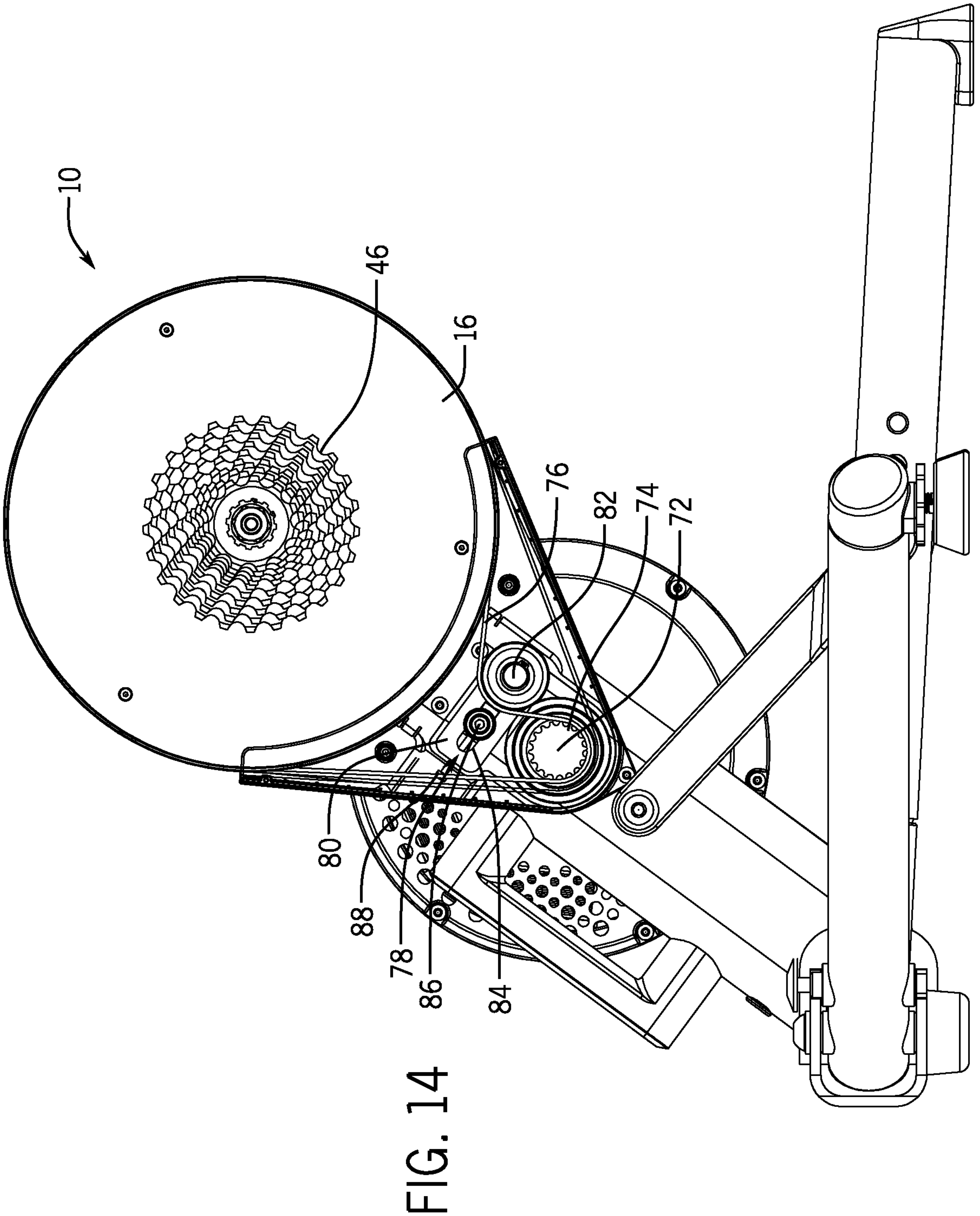
FIG. 14 is left side view of the trainer shown in FIG. 12, the view including a cover in transparent view to show various components otherwise hidden within the cover.

A generally triangular cover 126 is positioned over the belt 76, belt tensioner 78, flywheel axle 72, flywheel pulley 74, and other adjacent components, in an area between the pulley 16 and the flywheel pulley 74 at the flywheel axle 72. The cover 126 may be composed of a left side 128 and right side 130 that are bolted together. In one example, the left side 128 (shown in FIG. 11) may be removed to provide access to the covered components. As seen in FIG. 12, the flywheel assembly 68 can additionally include a cover 127 that covers the internal components of the assembly 68. FIG. 14 illustrates the cover 126 in transparent view thereby illustrating what components are covered.

Figure 15:
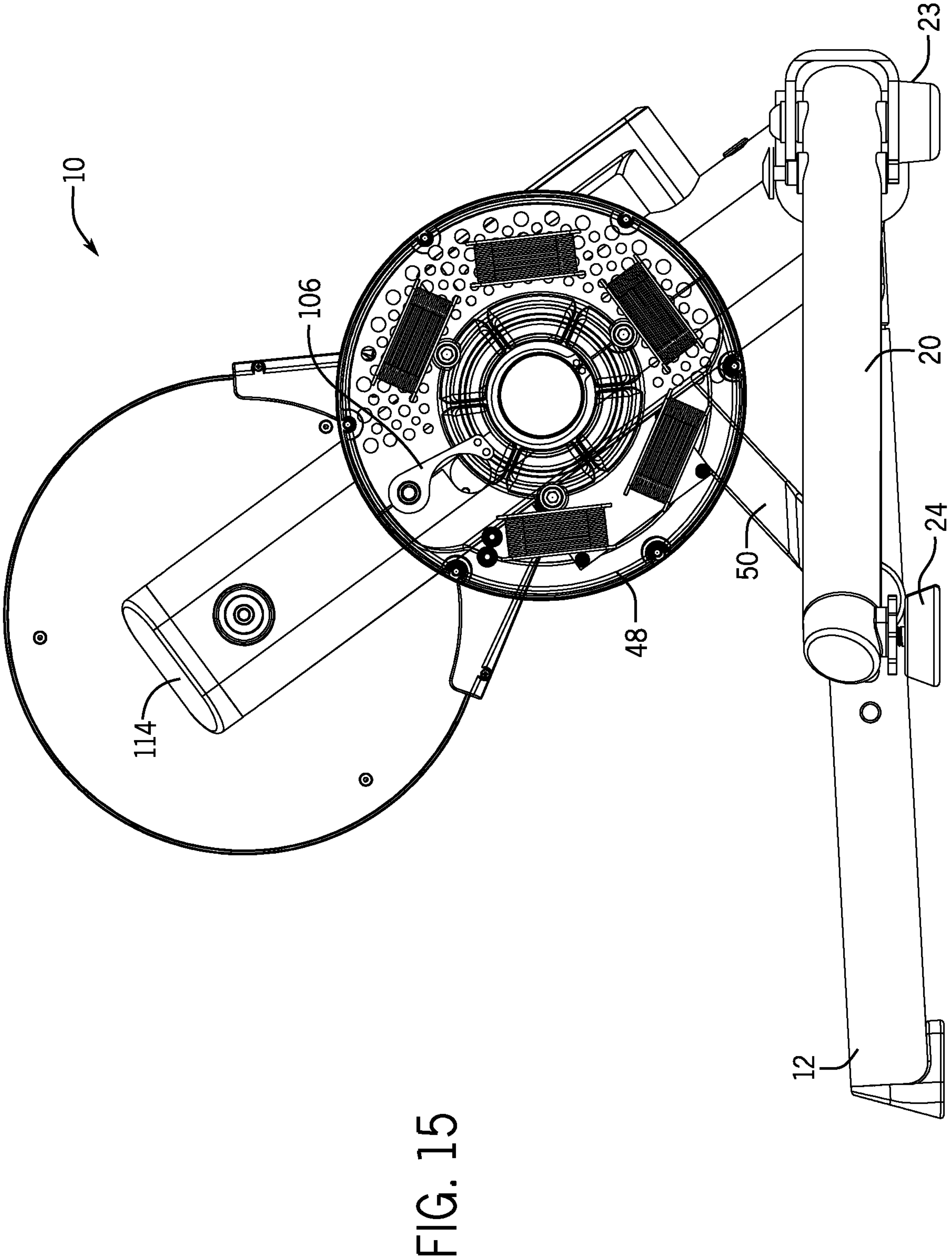
FIG. 15 is a right side view of the trainer shown in FIG. 12, the view including various flywheel assembly components hidden or in transparent view to illustrate a torque bracket coupling the magnetic brake with the frame.
Figure 16:
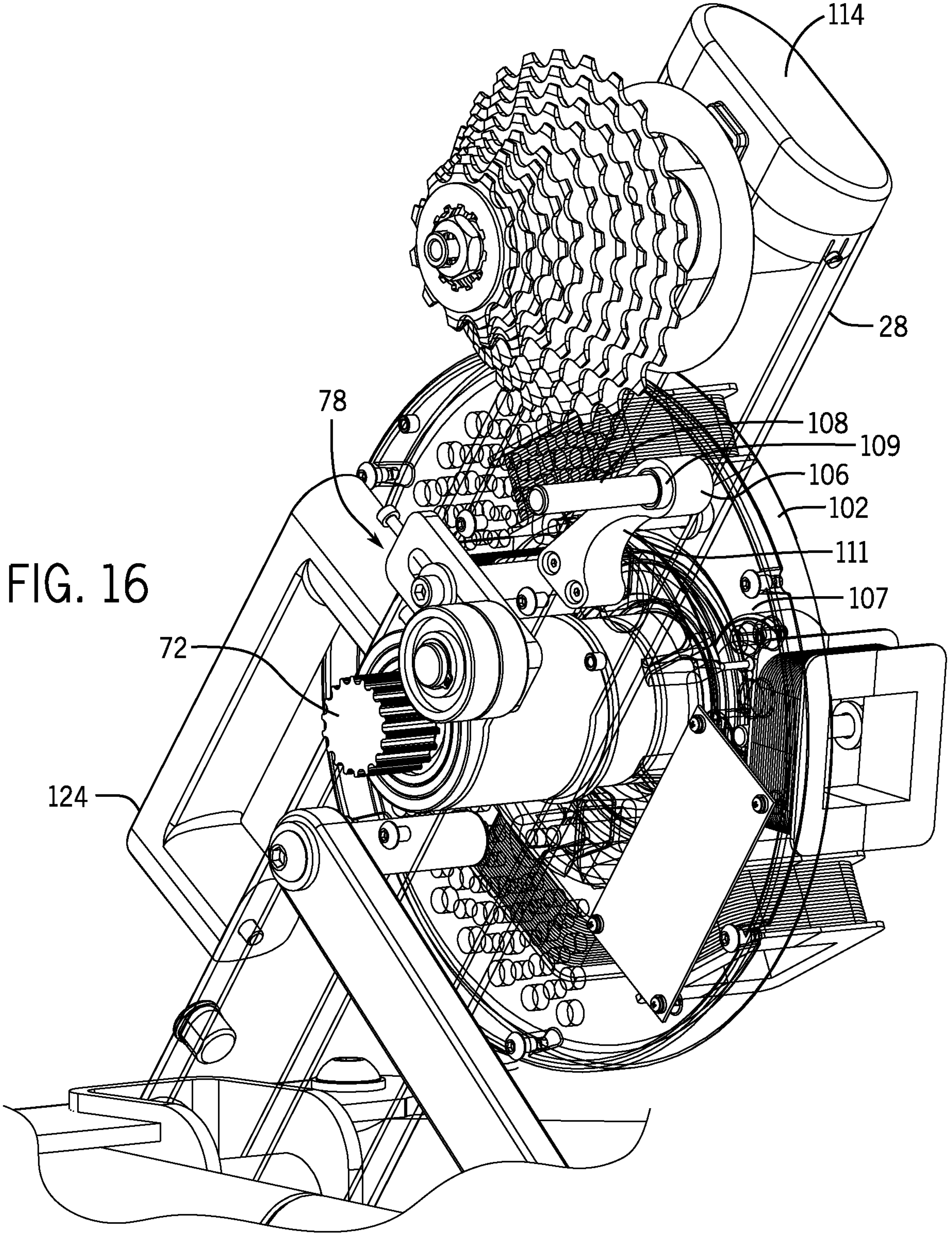
FIG. 16 is a rear isometric zoomed view of the flywheel assembly with various components hidden or transparent to illustrate the torque member and its relationship with the frame and the flywheel assembly.
Figure 17:
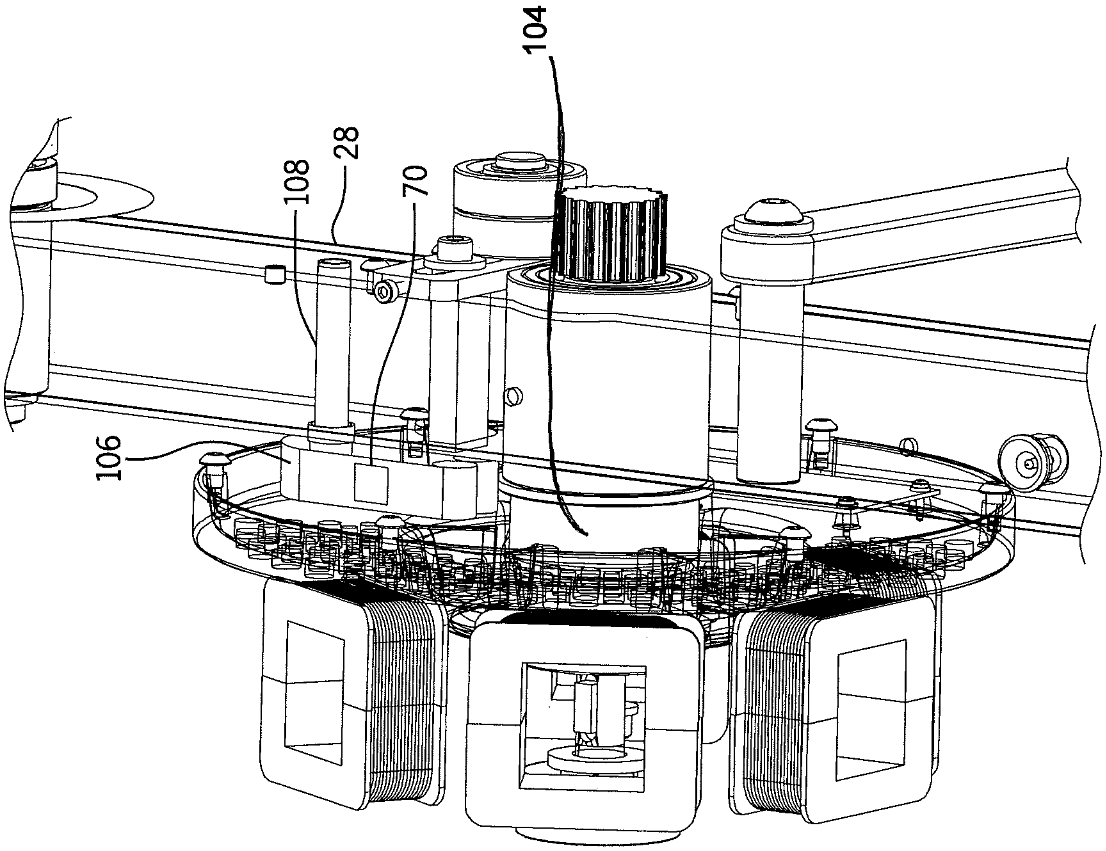
FIG. 17 is a front isometric zoomed view of the flywheel assembly with various components hidden or transparent to illustrate the torque member and its relationship with the frame and the flywheel assembly.

Referring now specifically to FIGS. 15-17, a torque bracket 106 is coupled between a flywheel mounting plate 132 and the main member 28. A strain gauge 70 is mounted on the torque bracket 106. The strain gauge 70 is positioned in a full bridge circuit 134 with 4 grids, with the gauges 70 arranged 90 degrees to each other. The four grids make a square and turn 90 degrees to the adjacent gauge 70. Two of the gauges 70 are up and down and two of the gauges 70 are side to side, and these matching pairs are on opposite corners from each other. They take a measurement of deflection on the torque member 106. The forces are measured by allowing the brake (the electromagnetic components that resist rotation of the flywheel) to rotate around the same axis as the flywheel 48. The strain gage member (torque member) 106 stops that rotation, and the force applied to that member 106 is measured. This force due to the motion constraint represents the torque.

The torque bracket 106 defines an aperture at one end, through which a pin 108 extends into the main member 28. A bushing 109 may also be press fit into the aperture with the pin 108 extending through the bushing 109. Two bolts secure the torque bracket 106 to the mounting plate 132. The bracket 106 necks down between the ends. The deflection of the torque bracket 106 is thus focused at the neck 111. Thus, the strain gauges 70 may be position on a flat surface of the necked area, as best shown in FIG. 17.

Figure 18:
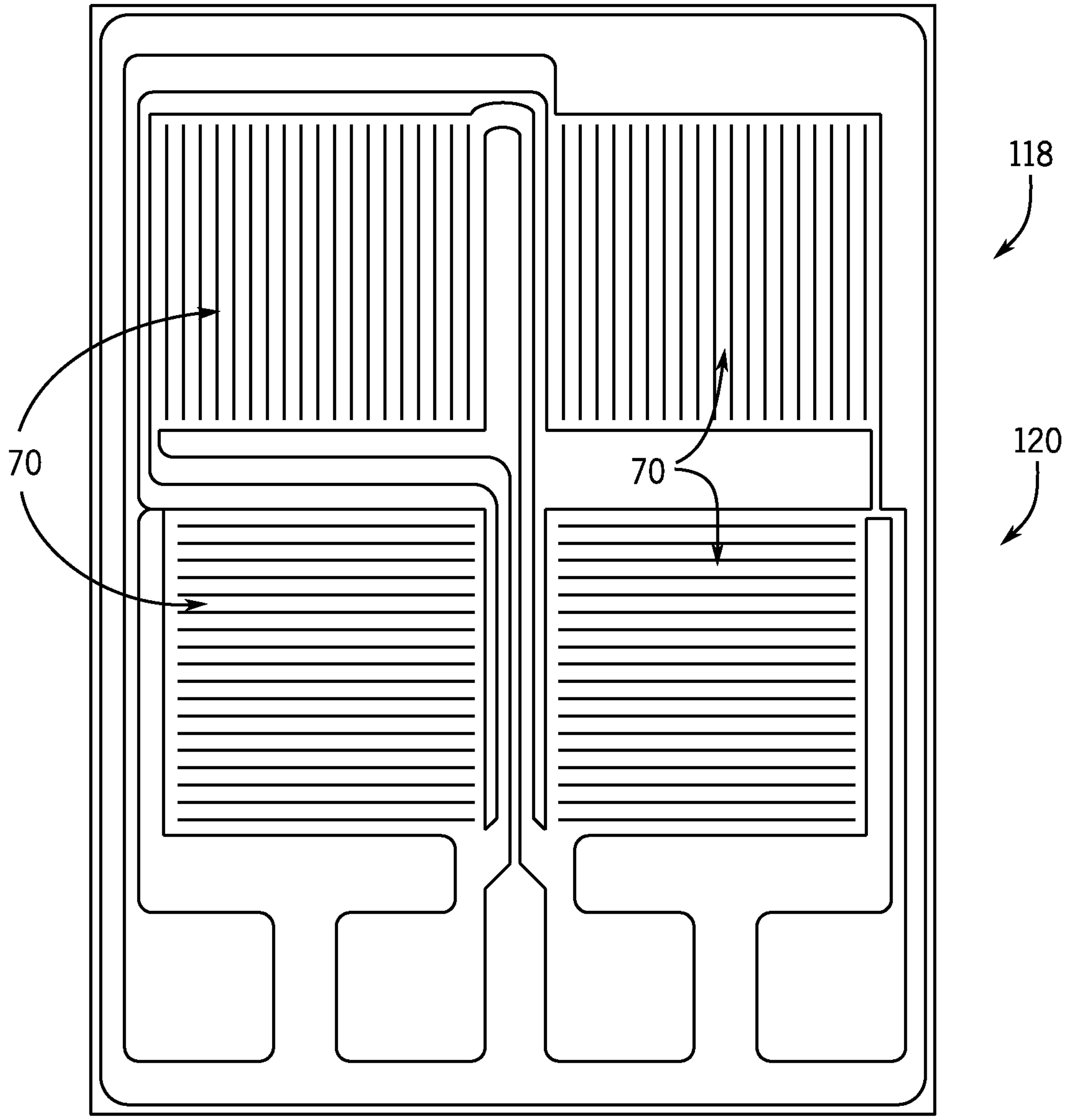
FIG. 18 is an electrical schematic of one example of a strain gauge that may be deployed on the torque member to measure the torque on the member, which may be used to measures a riders pedaling power.

FIG. 18 illustrates one example of a strain gauge 70. Each discrete gauge 70, different than described above but functioning similarly (shown in each quadrant of FIG. 18) includes leads connected in a full Wheatstone bridge circuit arrangement 118. Other circuit arrangements are possible that use more or less strain gauges 70, such as a quarter bridge or a half bridge configuration. An input voltage is applied to the bridge circuit 118 and the output voltage of the circuit is proportional to the bending force (torque) applied to the torque member 106. The output voltage may be applied to some form of conditioning and amplification circuitry, such as a differential amplifier and filter that will provide an output voltage to the processor 100. It is further possible to use an analog to digital converter to convert and condition the signal. A method of measuring power, among other features, is disclosed in application Ser. No. 13/356,487 titled "Apparatus, System and Method for Power Measurement," filed on 23 Jan. 2012, which is hereby incorporated by reference herein.

Referring to FIG. 18, there are two vertically positioned gauges 70 at the top of the strain gauge assembly 120, and two 70 horizontally arranged at the bottom of the strain gauge assembly 120. The upper, vertical, gauges 70 primarily detect deflection of the torque member 106.

Figure 19:
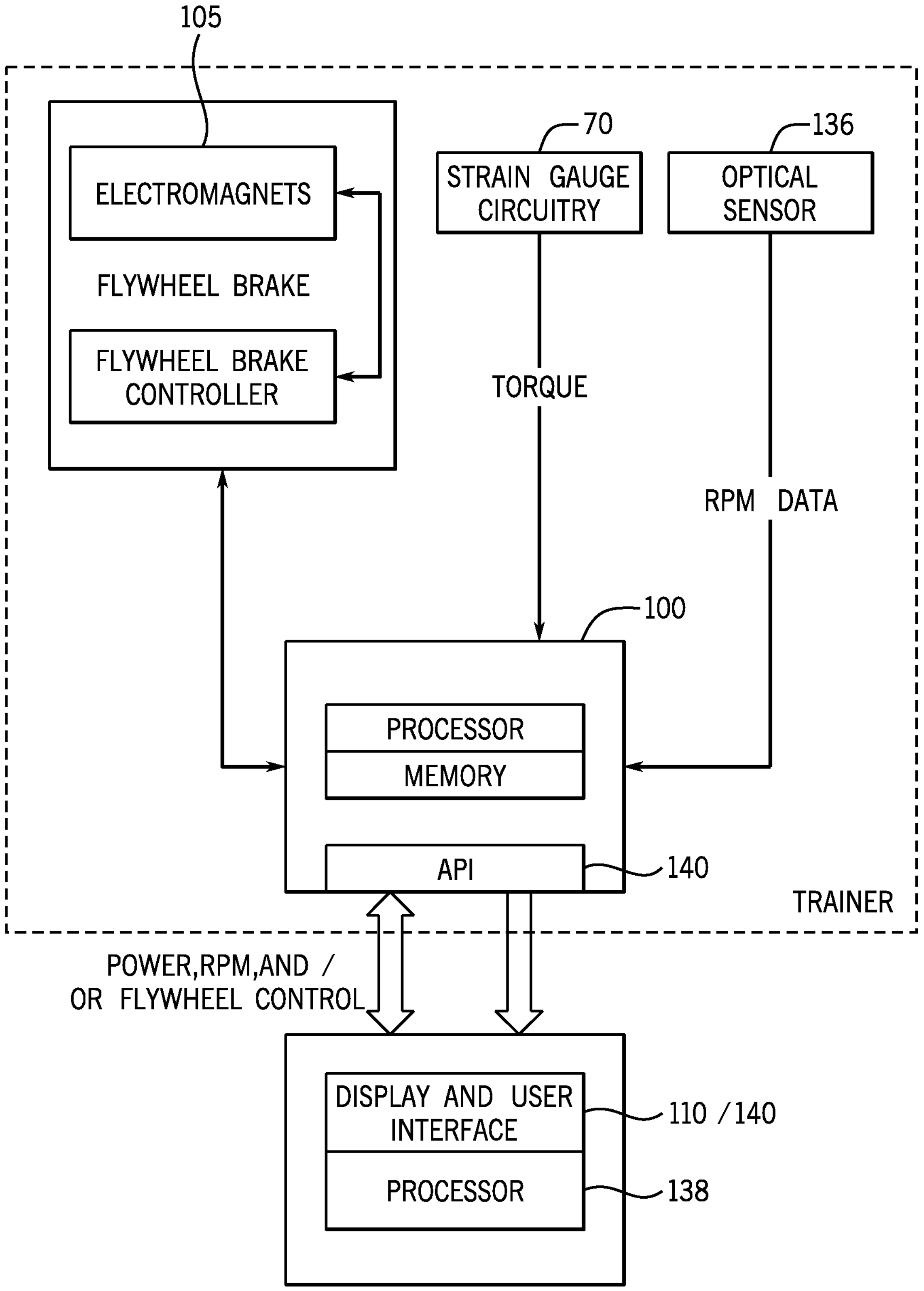
FIG. 19 is a block diagram of electrical components involved in obtaining torque data, calculating power data and controlling a magnetic brake of the flywheel, among others.

Referring now also to FIG. 19, among others, revolution per minute (RPM) of the rear wheel is measured at the pulley 16, such as through an optical sensor 136 and an alternative black and white pattern on the pulley 16. The optical sensor 136 detects the pattern as it rotates by the sensor and thereby produces a signal indicative of RPM. There is an 8:1 gear ratio between the pulley 16 and the flywheel 48 so by knowing the pulley RPM, the flywheel RPM is derived. Alternatively, the flywheel RPM may be measured directly. The measured torque multiplied by the flywheel RPM provides the power value, which may be calculated by the processor 100.

"Power" is the most common measurement of a rider's strength. With measured torque multiplied by the Rad/Sec value (RPM), power is calculated. In one example, the torque measurement and RPM measurements are communicated to a processor 100, and power is calculated. Power values may then be wirelessly transmitted to a second processor 138, coupled with a display 110 providing a user interface 140, using the ANT+ protocol developed by Dynastream Innovations, Inc. The transmitter may be a discrete component coupled with the processor 100 within the housing 116 at the top of the main member 28. The ANT protocol in its current iteration is unidirectional. Thus, power measurement and other data may be transmitted using the wireless ANT protocol.

Other protocols and wireless transmission mechanism may also be employed. In one specific example, the processor 100 is configured to communicate over a Bluetooth connection. For example, a smart phone, tablet or other device that communicates over a Bluetooth connection may receive data, such as power data and RPM data, from the processor 100, and may also transmit control data to the processor 100. For example, a smart phone running a bicycle training app may provide several settings. In one example, a rider, interacting through the user interface 140, may select a power level for a particular training ride. The power level is associated with a power curve associated with RPM measurements of the trainer. As the rider uses the trainer 10, RPM and power measurements are transmitted to the computing device, and the app compares those values to the power level and transmits a brake control signal based on the comparison. So, for example, if the rider is generating more power than called for by the setting, the app will send a display signal to change cadence (RPM) and/or send a signal used by the processor 100 to reduce the braking force applied to the flywheel 48, with either change or both, causing the power output of the rider to be reduced. The app will continue to sample data and provide control signals for the rider to maintain the set level.

In another example, the trainer can be programmed to maintain a set power value. Thus, when a rider exceeds the set power value, a control signal from the first processor 100 to the second processor 138 increases magnetic braking. Conversely, when the rider is falling below the set power value, the first processor 100 directs the second processor 138 to decrease braking power. These and other examples uses may be realized by apps or other applications developed for the device. Thus, the main (first processor and memory) may provide an application programming interface (API) 140 to which connected devices, such as smart phones and tablets running apps, may pass data, commands, and other information to the device in order to control power, among other attributes of the trainer 10. Since conventional trainers 10 do not have integrated torque and power measurement capability in conjunction with mechanisms to automatically control a magnetic brake, the device opens up countless opportunities to customize control of the trainer, provide power based fitness training, interact or simulate recorded actual rides, simulate hill climbing and descending, coordinate the trainer 10 with graphical information such as speed changes, elevations changes, wind changes, rider weight and bike weight, etc.

Although various representative embodiments have been described above with a certain degree of particularity, those skilled in the art could make numerous alterations to the disclosed embodiments without departing from the spirit or scope of the inventive subject matter set forth in the specification. All directional references (e.g., upper, lower, upward, downward, left, right, leftward, rightward, top, bottom, above, below, vertical, horizontal, clockwise, and counterclockwise) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected to another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

The invention claimed is:

1. A cycling trainer to be used with a bicycle comprising:

a frame assembly supporting an axle to which a bicycle with a rear wheel removed may be connected to operably connect the bicycle to the bicycle trainer, the frame assembly comprising:

a main frame member supporting the axle;

a first leg and a second leg, each of the first and second legs being pivotally mounted on the frame assembly to pivot inwardly or outwardly relative to a longitudinal centerline of the cycling trainer; and a flywheel assembly supported by the frame assembly, the flywheel assembly comprising:

a magnetic brake assembly; and a flywheel member including a flywheel axle wherein the magnetic brake assembly is fixed relative to the flywheel member and the flywheel member is coupled with the axle such that the flywheel member spins relative to the magnetic brake assembly when a rider is pedaling the bicycle connected with the axle.

2. The cycling trainer of claim 1 wherein the magnetic brake assembly is an electromagnetic brake assembly further comprising a plurality of electromagnetic members mounted on a core, the electromagnetic members controllable to generate a magnetic field that magnetically couples with the flywheel member.

3. The cycling trainer of claim 2 wherein the plurality of electromagnetic members are each equidistantly spaced about the core.

4. The cycling trainer of claim 3 wherein each of the plurality of electromagnetic members comprises a T-shaped portion of the core extending radially from an annular main body and a conductor wound about the T-shaped portion.

5. The cycling trainer of claim 1 wherein the magnetic brake assembly and the flywheel member are rotationally supported relative to a common axis, and further comprising a member coupled between the magnetic brake assembly and the frame assembly, the member rotationally fixing the magnetic brake assembly relative to the flywheel member.

6. The cycling trainer of claim 1 further comprising:

a sensor to obtain a rotational velocity; and a computing element to provide a power value based on the rotational velocity.

7. The cycling trainer of claim 6 wherein the sensor is an optical sensor positioned to detect a pattern on the flywheel assembly to obtain the rotational velocity of the flywheel assembly.

8. The cycling trainer of claim 6 further comprising a strain gauge positioned to determine torque required to rotate the flywheel member, and the computing element further to provide the power value based on the rotational velocity and the torque.

9. The cycling trainer of claim 6, wherein the bicycle is operably coupled with the cycling trainer to drive the flywheel member and the power value is associated with the power of a person pedaling the bicycle.

10. The cycling trainer of claim 6, wherein the magnetic brake assembly is an electromagnetic brake assembly, the computing element configured to process a wirelessly transmitted signal from a remote device to control the electromagnetic brake assembly.

11. The cycling trainer of claim 10 wherein the wireless transmitted signal comprises a power setting.

12. The cycling trainer of claim 1 further comprising a pulley coupled with the flywheel axle, the pulley receiving a belt being driven from a bicycle operably coupled with the bicycle trainer.

13. The cycling trainer of claim 1, wherein the frame assembly further comprises a center frame member extending from the main frame member.

14. The cycling trainer of claim 13, wherein each of the first leg and the second leg pivots inwardly to be substantially parallel with the center frame member.

15. The cycling trainer of claim 13, further comprising a pulley supported by the frame assembly and configured to drive the flywheel member, wherein the central frame member is disposed below the pulley.

16. The cycling trainer of claim 13, wherein the flywheel member is offset from the center frame member.

17. The cycling trainer of claim 1, wherein the frame assembly includes a bracket to which the first leg and the second leg are pivotally coupled, the bracket configured to positively retain each of the first leg and the second leg in each of an inwardly pivoted configuration and an outwardly pivoted configuration.

18. The cycling trainer of claim 17, wherein the bracket includes notches to positively retain each of the first leg and the second leg in at least one of the inwardly pivoted configuration and the outwardly pivoted configuration.

19. The cycling trainer of claim 1 further comprising pads coupled to outer ends of each of the first leg and the second leg and configured to support the cycling trainer on a surface.

20. The cycling trainer of claim 19, wherein the pads are threadedly coupled to each of the first leg and the second leg to permit vertical adjustment of the pads relative to the first leg and the second leg.

* * * * *